(12) United States Patent
Hirota et al.

(10) Patent No.: US 8,380,976 B2
(45) Date of Patent: Feb. 19, 2013

(54) SYSTEM, SERVER, METHOD, AND COMPUTER PROGRAM FOR RELAYING ELECTRONIC MAIL

(75) Inventors: Kenji Hirota, Yamato (JP); Tomonori Sugiura, Yamato (JP); Hidekuni Ueda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/771,894

(22) Filed: Apr. 30, 2010

(65) Prior Publication Data

US 2011/0113233 A1    May 12, 2011

(30) Foreign Application Priority Data

Apr. 30, 2009 (JP) ................................ 2009-110477

(51) Int. Cl.
*G06F 21/00* (2006.01)
(52) U.S. Cl. .......... 713/150; 709/203; 709/204; 705/27; 726/2; 726/22; 370/428; 370/466
(58) Field of Classification Search .................. 713/150
See application file for complete search history.

(56) References Cited

U.S. PATENT DOCUMENTS

| | | | | |
|---|---|---|---|---|
| 7,558,833 B2* | 7/2009 | Sherwood | ...................... | 709/207 |
| 7,739,334 B1* | 6/2010 | Ng et al. | ...................... | 709/206 |
| 2002/0023138 A1* | 2/2002 | Quine et al. | ...................... | 709/206 |
| 2002/0150124 A1* | 10/2002 | Asano | ........................... | 370/474 |
| 2005/0190403 A1* | 9/2005 | Nakamura | ................... | 358/1.15 |
| 2006/0059238 A1* | 3/2006 | Slater et al. | ................... | 709/206 |
| 2006/0123037 A1* | 6/2006 | Takeshita et al. | ............ | 707/101 |
| 2007/0038703 A1* | 2/2007 | Tendjoukian et al. | ........ | 709/206 |

(Continued)

FOREIGN PATENT DOCUMENTS

| | | |
|---|---|---|
| JP | 2000-174802 A | 6/2000 |
| JP | 2001-145765 A | 5/2001 |

(Continued)

OTHER PUBLICATIONS

Relay Server|http://infocenter.sybase.com/help/topic/com.sybase.help.sqlanywhere.12.0.0/pdf/relayserver12.pdf|Sybase|2010.*

(Continued)

*Primary Examiner* — Taghi Arani
*Assistant Examiner* — Mahfuzur Rahman
(74) *Attorney, Agent, or Firm* — Jeffrey T. Holman

(57) ABSTRACT

A system, a server, a method, and a computer program are described for relaying an electronic mail without a leak of secret information included in a quoted electronic mail to an unintended recipient without impairing the usability of the electronic mail system. The server receives an electronic mail that is newly created by one of the clients with quotation from one or a plurality of electronic mails received in the past. The server determines, for each quoted electronic mail quoted in the received electronic mail, whether a destination designated in the received electronic mail is included in an originator and a destination set in each quoted electronic mail. The server edits the content of each quoted electronic mail that is determined not to include the destination designated in the received electronic mail. The server transfers the electronic mail including the edited quoted electronic mail to the designated destination. The server stores edition information for returning the edited quoted electronic mail to a state before the editing in association with information that identifies the received electronic mail.

14 Claims, 19 Drawing Sheets

U.S. PATENT DOCUMENTS

| | | | |
|---|---|---|---|
| 2008/0010348 A1* | 1/2008 | Dawson et al. | 709/206 |
| 2008/0133673 A1* | 6/2008 | Abdelhadi et al. | 709/206 |
| 2010/0076989 A1* | 3/2010 | Jakobson | 707/758 |

FOREIGN PATENT DOCUMENTS

| | | |
|---|---|---|
| JP | 2004-171468 A | 6/2004 |
| JP | 2007-251796 A | 9/2007 |
| JP | 2010-160620 | 7/2010 |

OTHER PUBLICATIONS

Aragane "A Study for Email Wrong Transmission", IPSJ Symposium Series, Information Processing Society of Japan, vol. 1, (Jul. 2007), pp. 493-499.

* cited by examiner

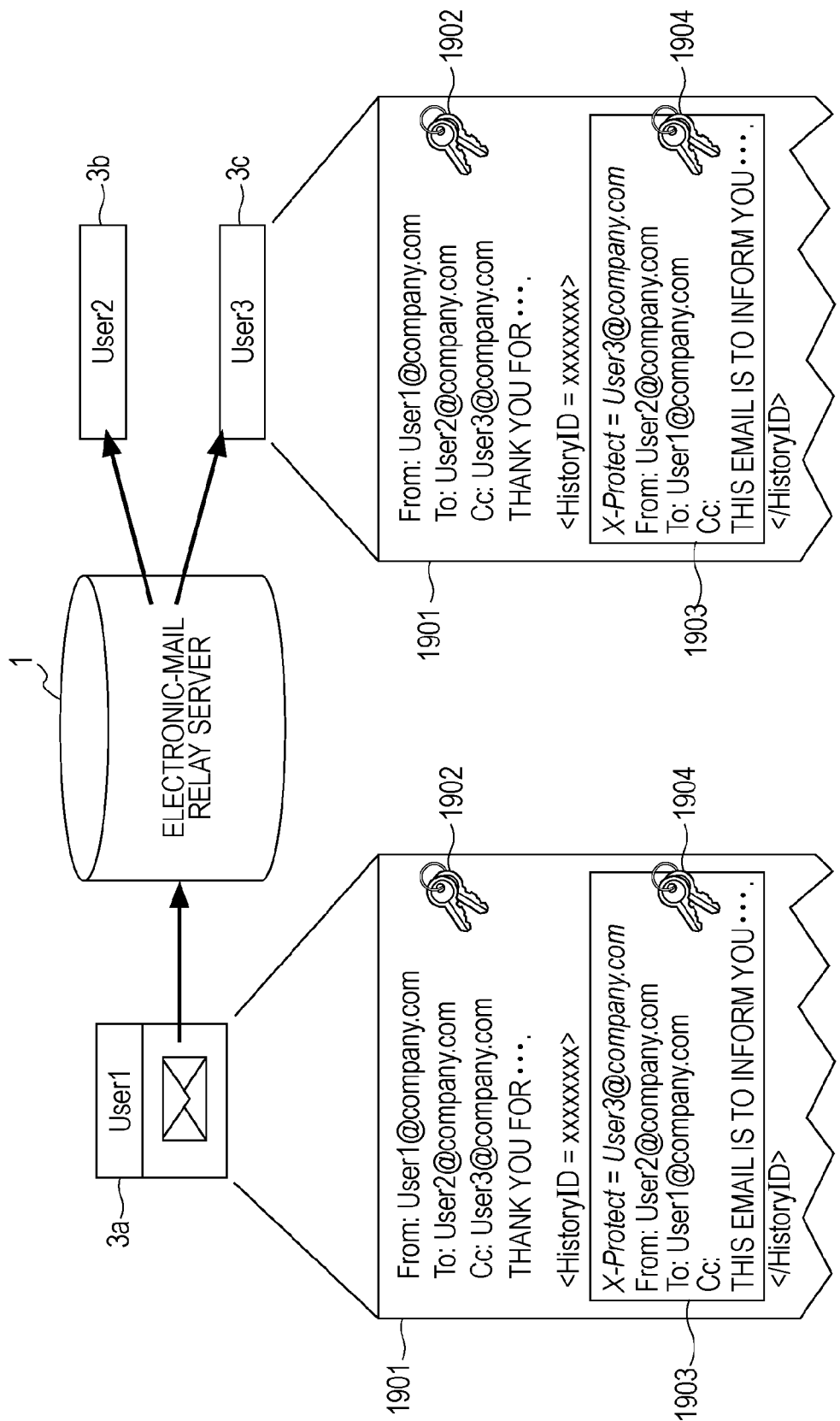

SYSTEM, SERVER, METHOD, AND COMPUTER PROGRAM FOR RELAYING ELECTRONIC MAIL

CROSS-REFERENCE TO RELATED APPLICATIONS

This application claims the benefit of priority of Japanese Patent Application No. 2009-110477 (Ser. No. 12/771,894) entitled "System, Server, Method, and Computer Program for Relaying Electronic Mail," which was filed on Apr. 30, 2009, and is hereby incorporated by reference.

BACKGROUND

With rapid development of Internet technology, information exchange using electronic mails is frequently performed. When exchanging electronic mails, reply mails are often generated with quotation from received electronic mails. By exchanging electronic mails many times, many electronic mails exchanged in the past are quoted to make a long electronic mail.

The electronic mail that becomes long by several times of exchange of electronic mails has history information including the past quoted mail messages of several times. If such history information includes secret information, there is a risk that the secret information will be disclosed to an unintended third person by repeatedly transmitting and receiving the new electronic mail with quotation from the received electronic mails.

As a technology for preventing information included in electronic mails from being disclosed to the outside, for example, one conventional approach includes an image transmission system that transmits information on image data of an electronic mail that requests transmission of the image data in encrypted form. Another conventional approach includes an electronic-mail server system in which information on the originator of a return mail is encrypted to allow anonymous originator and recipient to exchange mails. Another conventional approach includes an information processing apparatus in which an electronic-mail transmitting section transmits electronic mails in encrypted form. Another conventional approach includes a game-machine management system equipped with a history-information mail box.

However, in some of the conventional approaches, the object to be encrypted is information on image data or an originator, and information itself included in a quoted electronic mail is not encrypted; therefore, a leak of secret information included in the quoted electronic mail cannot be prevented. Also, in some conventional approaches, although a leak of secret information can be prevented because an electronic mail itself is encrypted, not only a quoted electronic mail but also a newly created electronic mail cannot be read. This poses the problem of complicating even a normal mail exchange procedure, thus impairing the usability of the electronic mail system. Also, in some conventional approaches, storing the history information of an electronic mail allows a determination whether secret information is included; however, at the transmission of the electronic mail, transmission of the electronic mail including secret information can be stopped, but the usability of the electronic mail system is inevitably impaired.

SUMMARY

Embodiments of a system, a server, a method, and a computer program are described for relaying an electronic mail without a leak of secret information included in a quoted electronic mail to an unintended recipient without impairing the usability of the electronic mail system. In one embodiment, a server is connected to a plurality of clients so as to be able to transmit and receive electronic mails thereto and therefrom to thereby relay the electronic mails. The server includes an electronic-mail receiving section to receive an electronic mail that is newly created by one of the clients with quotation from one or a plurality of electronic mails received in the past. The server also includes a destination determining section to determine, for each quoted electronic mail quoted in the received electronic mail, whether a destination designated in the received electronic mail is included in an originator and a destination set in each quoted electronic mail. The server also includes an editing section to edit the content of each quoted electronic mail that is determined by the destination determining section not to include the destination designated in the received electronic mail. The server also includes a transferring section to transfer the electronic mail including the quoted electronic mail edited by the editing section to the designated destination. The server also includes an information storing section to store edition information for returning the quoted electronic mail edited by the editing section to a state before the editing in association with information that identifies the received electronic mail. Other embodiments are also described.

BRIEF DESCRIPTION OF THE DRAWINGS

FIG. 19 is a schematic diagram showing the flow of an electronic-mail transmission process of the electronic mail system according to the third embodiment of the invention in the case of designating mail recipients to whom quoted electronic mails may be disclosed.

DETAILED DESCRIPTION

Figure 1:
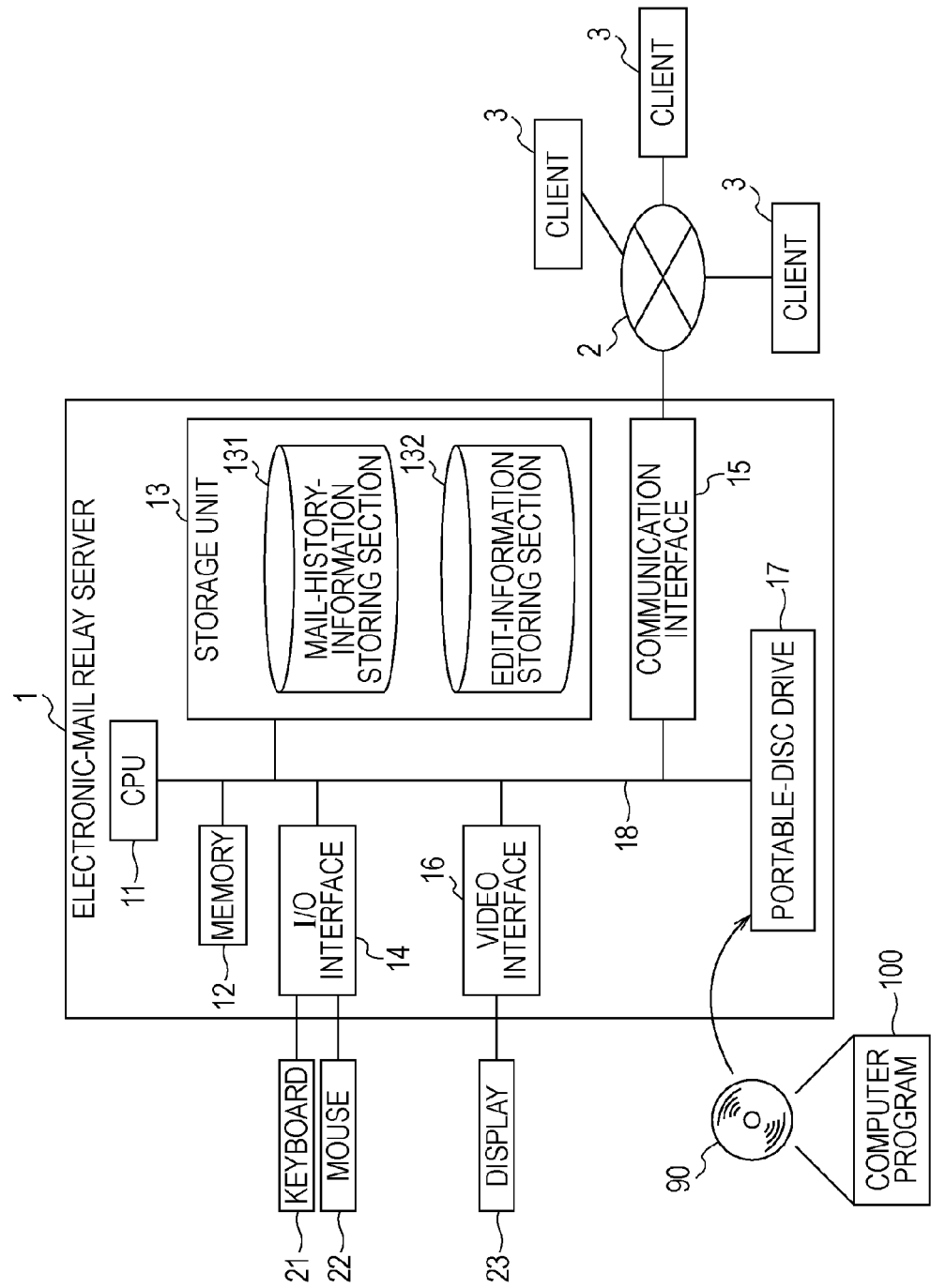
FIG. 1 is a block diagram showing a configuration example of an electronic mail system according to a first embodiment of the present invention.

A system for relaying electronic mails according to embodiments of the present invention will be described hereinbelow with reference to the drawings. It is to be understood that the embodiments below do not limit the invention described in the claims and that all of combinations of characteristics described in the embodiments are not essential.

The present invention can be embodied in many different forms and should not be limited to the description of the embodiments. The same components are given the same reference numerals throughout the embodiments.

Although the embodiments below are described when applied to a system constituted of a plurality of computer systems in which a computer program is installed, the present invention can be embodied as a computer program capable of executing part or all thereof with a computer. Accordingly, the invention can adopt various embodiments, such as software and a system constituted of a plurality of computer systems in which a computer program is installed. The computer program can be stored in recording media that can be read by any computer, such as a hard disk, a DVD, a CD, an optical storage unit, and a magnetic storage unit.

The embodiments of the present invention shown below allow even a new electronic mail that is created with quotation from an electronic mail transmitted and received in the past to be transmitted to a new destination according to a normal electronic-mail creation procedure without indiscriminately disclosing secret information included in the quoted electronic mail. When approval of a creator who created an electronic mail with quotation from an electronic mail, if including encrypted secret information, is given, key information that allows the secret information to be decrypted can be acquired, thus allowing the secret information to be read.

In other words, even if a new electronic mail is created with quotation from an electronic mail transmitted and received in the past, the new electronic mail can be transmitted according to a normal electronic-mail creation procedure without indiscriminately disclosing secret information included in the quoted electronic mail to a new destination. Moreover, if the secret information is encrypted, key information that can decrypts the secret information can be acquired when approval of the creator of an electronic mail that quotes an electronic mail including the secret information is given, which allows the secret information to be read.

FIG. 1 is a block diagram showing a configuration example of an electronic mail system according to a first embodiment of the present invention. The electronic mail system according to the first embodiment of the invention is configured such that a plurality of clients 3 that are originators and recipients of electronic mails use and an electronic-mail relay server 1 are connected over a network 2 to allow data communication.

The electronic-mail relay server 1 includes at least a CPU (central processing unit) 11, a memory 12, a storage unit 13, an I/O interface 14, a communication interface 15, a video interface 16, a portable-disc drive 17, and an internal bus 18 that connects the hardware mentioned above.

The CPU 11 is connected to the above-mentioned hardware components of the electronic-mail relay server 1 through the internal bus 18. The CPU 11 controls the operations of the above-mentioned hardware components and implements various software functions in accordance with a computer program 100 stored in the storage unit 13. The memory 12 is a volatile memory, such as an SRAM or an SDRAM, in which a load module is expanded at the time of execution of the computer program 100 to store temporary data etc. generated during the execution of the computer program 100.

The storage unit 13 is a built-in fixed storage unit (hard disk), a ROM, or the like. The computer program 100 stored in the storage unit 13 is downloaded using the portable-disc drive 17 from a portable recording medium 90, such as a DVD or a CD-ROM, in which information, such as programs and data, is stored, and at runtime, it is expanded from the storage unit 13 to the memory 12 for execution. Of course, a computer program downloaded from an external computer connected to the network 2 through the communication interface 15 may be used.

The storage unit 13 includes a mail-history-information storing section 131 and an edit-information storing section 132. The mail-history-information storing section 131 stores electronic mails relayed by the electronic-mail relay server 1 and transmitted and received among the clients 3 in association with history information IDs that identify the electronic mails as history information and the senders and the recipients of the electronic mails. The mail-history-information storing section 131 also stores edit flag information indicating whether the details of a transmitted electronic mail has been edited when the transmitted electronic mail is relayed and transferred to a destination.

The edit-information storing section 132 stores the details of the editing process executed when the transmitted electronic mail is relayed and transferred to the destination. For example, if an electronic mail quoted (hereinafter, referred to as a quoted electronic mail) is deleted, the edit-information storing section 132 stores the deleted quoted electronic mail in association with history information ID that identifies its history information. This allows the deleted quoted electronic mail to be restored if it is transferred to a destination where there is no need to delete the quoted electronic mail.

The communication interface 15 is connected to the internal bus 18 and is capable of data transmission and reception to/from the clients 3 etc. through connection to the external network 2, such as the Internet, a LAN, or a WAN.

The I/O interface 14 is connected to data entry devices, such as, a keyboard 21 and a mouse 22, and accepts data entry. The video interface 16 is connected to a display 23, such as a CRT monitor or an LCD, and displays an image.

Figure 2:
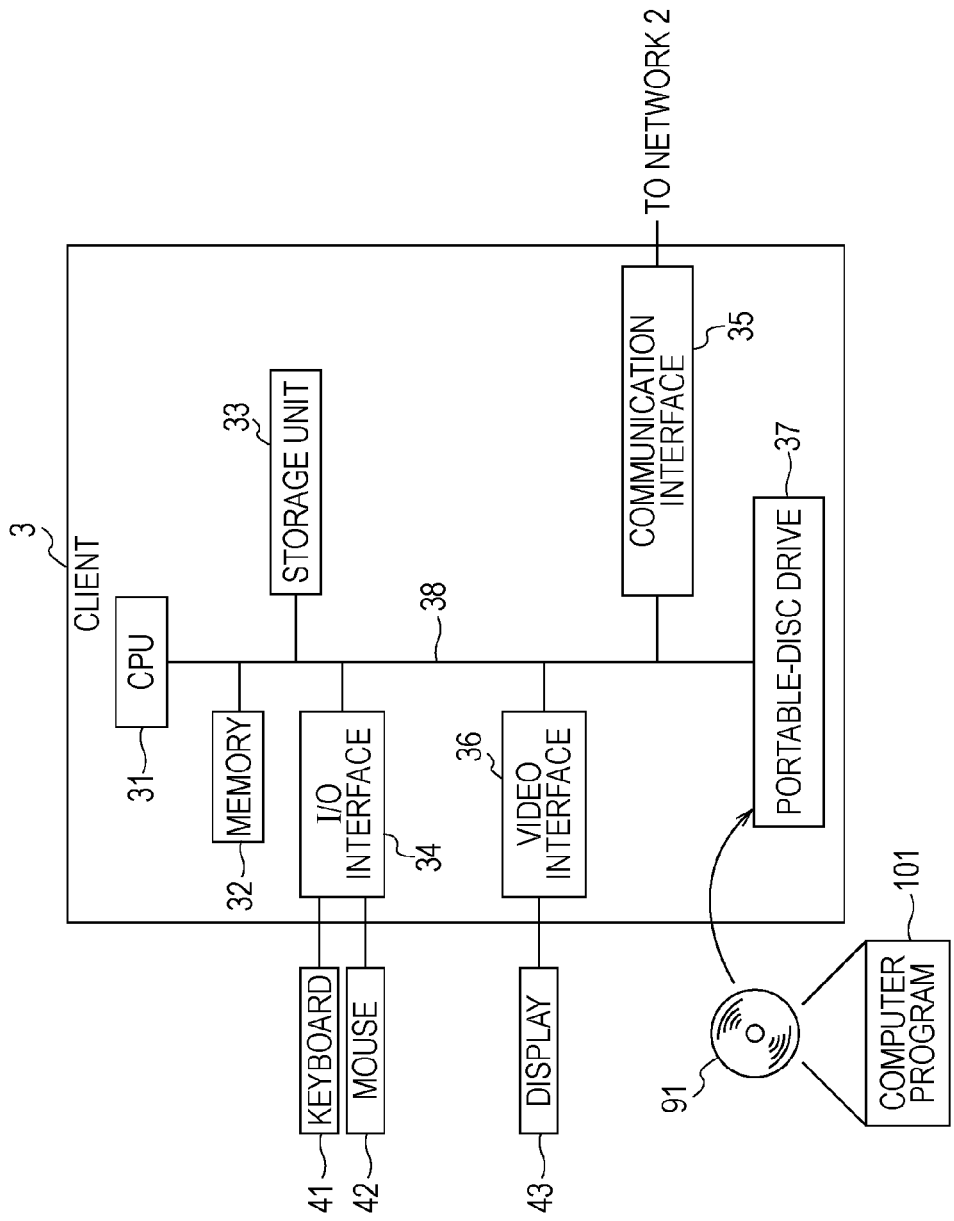
FIG. 2 is a block diagram of a configuration example of a client according to the first embodiment of the invention.

FIG. 2 is a block diagram of a configuration example of the client 3 according to the first embodiment of the invention. The client 3 according to the first embodiment of the invention includes at least a CPU (central processing unit) 31, a memory 32, a storage unit 33, an I/O interface 34, a communication interface 35, a video interface 36, a portable-disc drive 37, and an internal bus 38 that connects the hardware described above.

The CPU 31 is connected to the above-mentioned hardware components of the client 3 through the internal bus 38. The CPU 31 controls the operations of the above-mentioned hardware components and implements various software functions in accordance with a computer program 101 stored in the storage unit 33. The memory 32 is a volatile memory, such as an SRAM or an SDRAM, in which a load module is expanded at the time of execution of the computer program 101 to store temporary data etc. generated during the execution of the computer program 101.

The storage unit 33 is a built-in fixed storage unit (hard disk), a ROM, or the like. The computer program 101 stored in the storage unit 33 is downloaded using the portable-disc drive 37 from a portable recording medium 91, such as a DVD or a CD-ROM, in which information, such as programs and data, is stored, and at runtime, it is expanded from the storage unit 33 to the memory 32 for execution. Of course, a computer program downloaded from an external computer connected to the network 2 through the communication interface 35 may be used.

The communication interface 35 is connected to the internal bus 38 and is capable of data transmission and reception to/from the electronic-mail relay server 1, the clients 3, etc. through connection to the external network 2, such as the Internet, a LAN, or a WAN.

The I/O interface 34 is connected to data entry devices, such as, a keyboard 31 and a mouse 42, and accepts data entry. The video interface 36 is connected to a display 43, such as a CRT monitor or an LCD, and displays an image.

Figure 3:
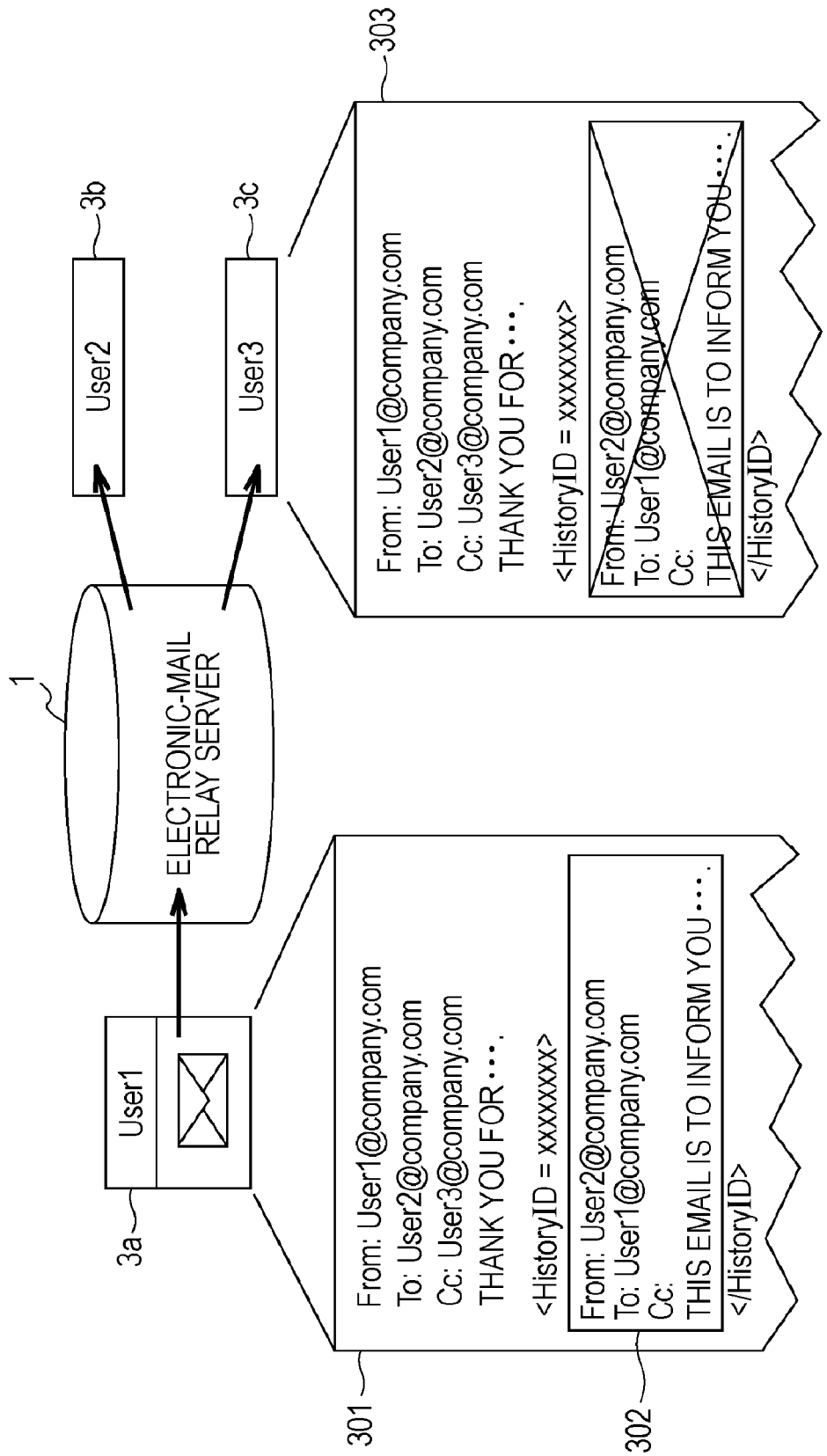
FIG. 3 is a schematic diagram showing the flow of an electronic-mail transmission process of the electronic mail system according to the first embodiment of the invention.

The operation of the electronic mail system using the electronic-mail relay server 1 with the configuration described above will be described hereinbelow. FIG. 3 is a schematic diagram showing the flow of an electronic-mail transmission process of the electronic mail system according to the first embodiment of the invention. In FIG. 3, a mail sender User1 creates and transmits a new electronic mail with a client 3a used.

In the example of FIG. 3, the mail sender User1 creates a new electronic mail 301 with quotation from an electronic mail 302 received from a mail recipient User2 in the past and transmits the electronic mail 301 to the mail recipient User2 and a mail recipient User3. The quoted electronic mail 302 quoted from the mail recipient User2 is stored in the mail-history-information storing section 131 and is assigned a history information ID (History ID) that identifies its history information.

The electronic mail 301 that is newly created with quotation from the quoted electronic mail 302 is transmitted to the electronic-mail relay server 1 before being transmitted to a client 3b that the mail recipient User2 uses and a client 3c that the mail recipient User3 uses. The electronic-mail relay server 1 compares the destinations designated in the received electronic mail 301 with the originator and the destination set in the quoted electronic mail 302 to determine whether the destinations designated in the electronic mail 301 include a new destination not included in the quoted electronic mail 302.

In the example of FIG. 3, the mail recipient User2 is included in the originator set in the quoted electronic mail 302, but the mail recipient User3 is not included in the originator and the destination set in the quoted electronic mail 302. Accordingly, the electronic-mail relay server 1 determines that the mail recipient User3 is a new destination, who is a mail recipient to whom the quoted electronic mail 302 does not need to be disclosed, and edits the details of the electronic mail 301 so that the mail recipient User3 cannot read it.

Specifically, the electronic-mail relay server 1 transfers the electronic mail 301 as it is to the client 3b that the mail recipient User2 uses and transfers an electronic mail 303 in which the quoted electronic mail 302 is deleted from the electronic mail 301 to the client 3c that the mail recipient User3 uses. The mail recipient User3 cannot read the quoted electronic mail 302 because the quoted electronic mail 302 is deleted in the received electronic mail 303. Since only the history information ID is left, it can be determined that some information has been deleted. The quoted electronic mail 302, which is the deleted information, is stored, as edit information, in the edit-information storing section 132 of the electronic-mail relay server 1 in association with a new history information ID that identifies the electronic mail 303.

Figure 4:
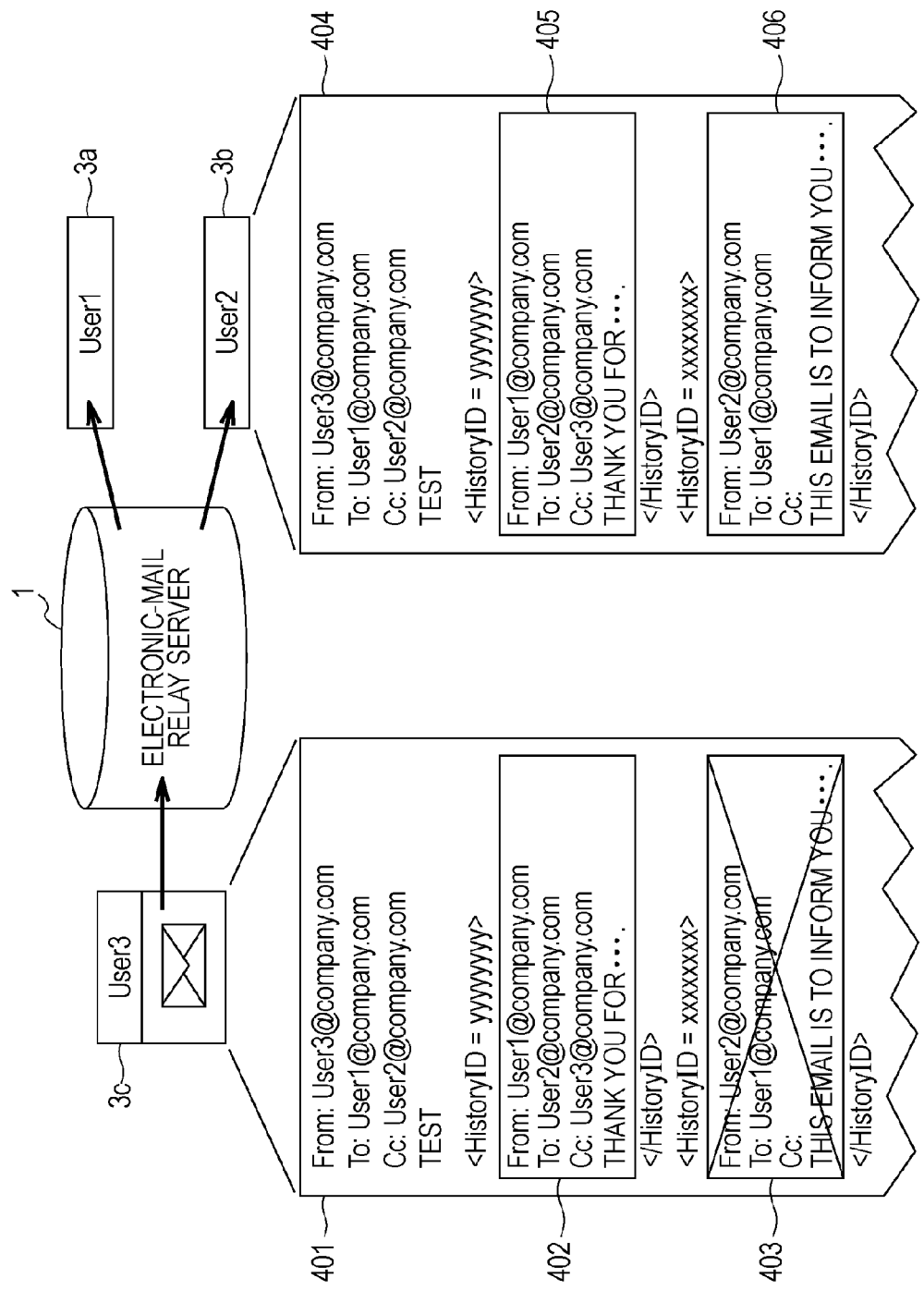
FIG. 4 is a schematic diagram showing the flow of an electronic-mail replying process of the electronic mail system according to the first embodiment of the invention.

FIG. 4 is a schematic diagram showing the flow of an electronic-mail replying process of the electronic mail system according to the first embodiment of the invention. In FIG. 4, the mail sender User3 creates and transmits a new electronic mail with the client 3c used.

In the example of FIG. 4, the mail sender User3 creates a new electronic mail 401 with quotation from an electronic mail 402 received from the mail recipient User 1 and an electronic mail 403 received from the mail recipient User2 in the past and replies to the mail recipient User1 and the mail recipient User2. The quoted electronic mails 402 and 403 quoted from the mail recipient User 1 and the mail recipient User2 are stored in the mail-history-information storing section 131 and are assigned history information IDs (History IDs) that identify their history information. For the quoted electronic mail 403, only the history information ID is included in the electronic mail 401, and the quoted electronic mail 403 is deleted.

The electronic mail 401 that is newly created with quotation from the quoted electronic mails 402 and 403 is transmitted to the electronic-mail relay server 1 before being transmitted to the client 3a that the mail recipient User1 uses and the client 3b that the mail recipient User2 uses. The electronic-mail relay server 1 restores the quoted electronic mail 403 that is deleted so as not to be read by the mail sender User3 on the basis of the edit information stored in the edit-information storing section 132. That is, all the quoted electronic mails 402 and 403 quoted in the electronic mail 401 can be read at this point of time.

Next, the electronic-mail relay server 1 compares the destinations designated in the received electronic mail 401 with the originators and the destinations set in the quoted electronic mails 402 and 403 to determine whether the destinations designated in the electronic mail 401 include a new destination that is not included in the originators and the destinations set in the quoted electronic mail 402 and the quoted electronic mail 403.

In the example of FIG. 4, both of the mail recipient User 1 and the mail recipient User2 are included in the originators and the destinations set in the quoted electronic mails 402 and 403. Therefore, the electronic-mail relay server 1 determines that, unlike in FIG. 3, the mail recipient User1 and the mail recipient User2 are mail recipients to whom the quoted electronic mails 402 and 403 may be disclosed and so does not edit the details of the electronic mail 401 so that the mail recipient User1 and the mail recipient User2 cannot read the electronic mail 401.

Specifically, the electronic-mail relay server 1 transfers the readable electronic mail 401 to the client 3a that the mail recipient User1 uses and the client 3b that the mail recipient User2 uses. For example, the mail recipient User2 can also read a quoted electronic mail 406 in addition to a quoted electronic mail 405 in the received electronic mail 404.

Figure 5:
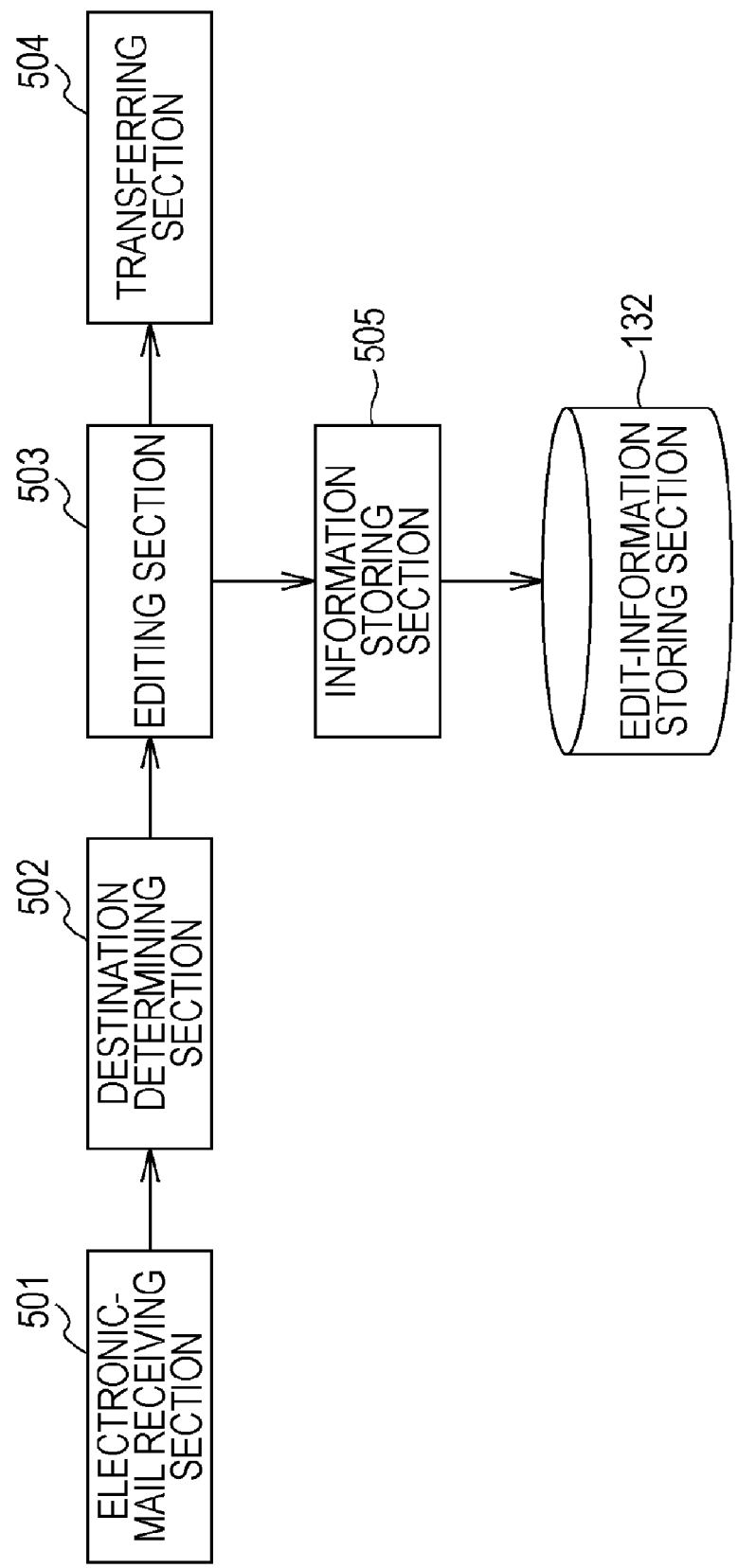
FIG. 5 is a functional block diagram of an electronic-mail relay server of the electronic mail system according to the first embodiment of the invention.

FIG. 5 is a functional block diagram of the electronic-mail relay server 1 of the electronic mail system according to the first embodiment of the invention. An electronic-mail receiving section 501 receives an electronic mail transmitted from one client 3 to one or a plurality of other clients 3. Assume that the received electronic mail is an electronic mail that is newly created with quotation from one or plurality of electronic mails.

A destination determining section 502 determines whether originators and destinations set in the quoted electronic mails quoted in the received electronic mail include the destination designated in the received electronic mail for each of the quoted electronic mails. If the destination designated in the received electronic mail is not included, it can be determined that the designated destination is a new destination. Disclosing the quoted electronic mails to the new destination can lead to a leak of secret information.

An editing section 503 edits the details of each of the quoted electronic mails that are determined by the destination determining section 502 not to include the destination designated in the received electronic mail. A method for editing is not particularly limited; any method for editing an electronic mail so that a mail recipient who is a new destination cannot read a quoted electronic mail may be adopted, such as deleting the quoted electronic mail while leaving only its history information ID, as history information, that identifies the quoted electronic mail or replacing the content of the quoted electronic mail with "*".

A transferring section 504 transfers the electronic mail including the quoted electronic mails edited by the editing section 503 to a designated destination. If there are a plurality of designated destinations, the transferring section 504 individually transmits the electronic mail including the edited quoted electronic mails to the designated destinations. Accordingly, even if the same quoted electronic mail is quoted, one mail recipient can read it and another mail recipient cannot read it.

An information storing section 505 stores edit information for returning the quoted electronic mail edited by the editing section 503 to a state before the editing in the edit-information storing section 132 in association with a history information ID that identifies the quoted electronic mail. Thus, even if the editing section 503 deletes a quoted electronic mail while leaving only its history information ID that identifies the quoted electronic mail as history information, or likewise, replaces the content of the quoted electronic mail with "*", and the like, the quoted electronic mail can be restored depending on the condition because the quoted electronic mail before the editing is stored in association with the history information ID.

Figure 6:
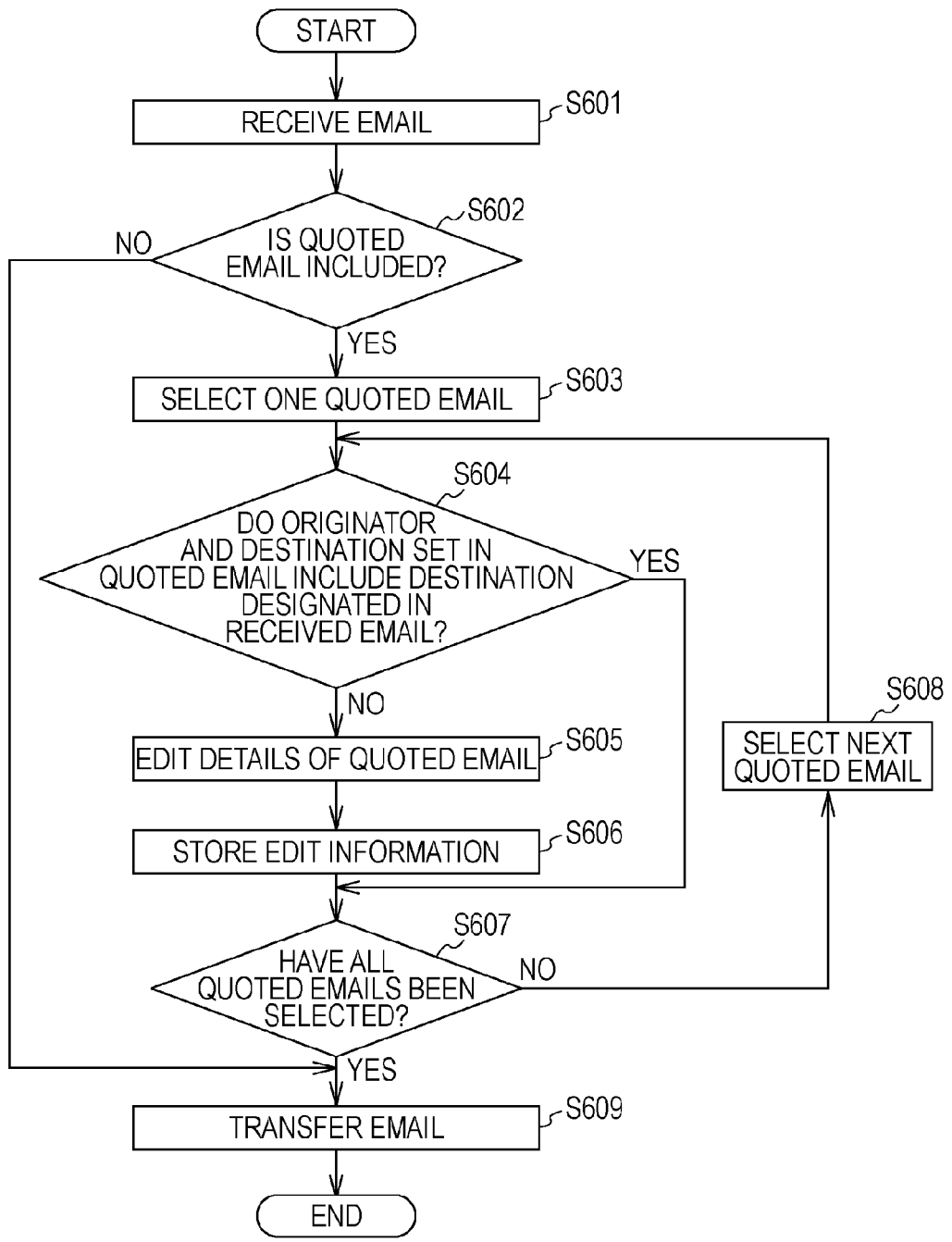
FIG. 6 is a flowchart showing the processing procedure of a CPU of the electronic-mail relay server according to the first embodiment of the invention.

FIG. 6 is a flowchart showing the processing procedure of the CPU 11 of the electronic-mail relay server 1 according to the first embodiment of the invention. The CPU 11 of the electronic-mail relay server 1 receives an electronic mail transmitted from one client 3 to one or a plurality of other clients 3 (step S601). The CPU 11 determines whether the received electronic mail is an electronic mail that is newly created with quotation from one or a plurality of electronic mails, that is, whether the received electronic mail includes a quoted electronic mail (step S602).

If the CPU 11 determines that the received electronic mail includes quoted electronic mails (step S602: YES), the CPU 11 selects one quoted electronic mail from the included quoted electronic mails (step S603) and determines whether an originator and a destination set in the selected quoted electronic mail include a destination designated in the received electronic mail (step S604).

If the CPU 11 determines that the originator and the destination set in the selected quoted electronic mail do not include the destination designated in the received electronic mail (step S604: NO), the CPU 11 edits the details of the quoted electronic mail (step S605). A method for editing is not particularly limited; any method for editing an electronic mail so that a mail recipient, who is a new destination, cannot read a quoted electronic mail may be adopted, such as deleting the quoted electronic mail while leaving only its history information ID, as history information, that identifies the quoted electronic mail or replacing the content of the quoted electronic mail with "*".

The CPU 11 stores edit information for returning the edited quoted electronic mail to a state before the editing in the edit-information storing section 132 in association with the history information ID that identifies the quoted electronic mail (step S606). Thus, even if the CPU 11 deletes a quoted electronic mail while leaving only its history information ID that identifies the quoted electronic mail as history information, or likewise, replaces the content of the quoted electronic mail with "*", and the like, the quoted electronic mail can be restored depending on the condition because the quoted electronic mail before the editing is stored in association with the history information ID.

If the CPU 11 determines that the originator and the destination set in the selected quoted electronic mail include the destination designated in the received electronic mail (step S604: YES), the CPU 11 skips step S605 and step S606 and determines whether all the quoted electronic mails included in the received electronic mail have been selected (step S607). If the CPU 11 determines that there is an unelected quoted electronic mail (step S607: NO), the CPU 11 selects the next quoted electronic mail (step S608), returns the process to step S604, and repeats the process described above.

If the CPU 11 determines that the received electronic mail includes no quoted electronic mail (step S602: NO), the CPU 11 skips step S603 to step S608, and if the CPU 11 determines that all the quoted electronic mails included in the received electronic mail have been selected (step S607: YES), the CPU 11 transfers the electronic mail including the quoted electronic mails to the designated destination (step S609).

According to the first embodiment, as described above, even if a new electronic mail is created with quotation from an electronic mail transmitted and received in the past, the new electronic mail can be transmitted according to a normal electronic-mail creation procedure without indiscriminately disclosing secret information included in the quoted electronic mail to a new destination.

If an originator who created, immediately before, an electronic mail that quotes from an electronic mail that cannot be read by a mail recipient approves that the mail recipient reads the quoted electronic mail, the unedited quoted electronic mail stored in the edit-information storing section 132 can be decrypted and changed to a state in which the mail recipient can read the quoted electronic mail. For example, the recipient of the electronic mail including the quoted electronic mail in an unreadable state transmits a restore request to the electronic-mail relay server 1. The electronic-mail relay server 1 that has received the restore request requests an originator set in the quoted electronic mail to approve disclosure.

Only when approval to disclosure is transmitted from the originator, the electronic-mail relay server 1 extracts the quoted electronic mail by inquiring of the mail-history-information storing section 131 with the history information ID of the quoted electronic mail as key information. By transmitting the extracted quoted electronic mail to the mail recipient who is the sender of the restore request, the quoted electronic mail can be disclosed only to the approved mail recipient.

Not only the originator set in the quoted electronic mail is requested for approval to disclosure, but also a mail address that a user (supervisor etc.) having approval rights on whether to disclose the quoted electronic mail uses may be requested for approval to disclosure. In this case, only when approval to disclosure is transmitted from the user, the electronic-mail relay server 1 extracts the quoted electronic mail by inquiring of the mail-history-information storing section 131 with the history information ID of the quoted electronic mail as key information and transmits the extracted quoted electronic mail to the mail recipient who is the sender of the restore request.

The configuration of an electronic mail system according to a second embodiment of the invention is similar to that of the first embodiment. Therefore, its detailed description will be omitted by giving the same reference numerals. The second embodiment differs from the first embodiment in that the quoted electronic mail is encrypted using encryption key information.

The mail-history-information storing section 131 of the storage unit 13 stores electronic mails relayed by the electronic-mail relay server 1 and transmitted and received among the clients 3 in association with history information IDs that identify the electronic mails as history information and the senders and the recipients of the electronic mail. The mail-history-information storing section 131 also stores encryption flag information indicating whether a quoted electronic mail has been encrypted when the transmitted electronic mail is relayed and transferred to a designated destination.

The edit-information storing section 132 stores encryption key information used to encrypt the quoted electronic mail when the transmitted the transmitted electronic mail is relayed and transferred to the designated destination. That is, by storing the encryption key information that is used to encrypt the quoted electronic mail, the encrypted quoted electronic mail can be decrypted when necessary.

Figure 7:
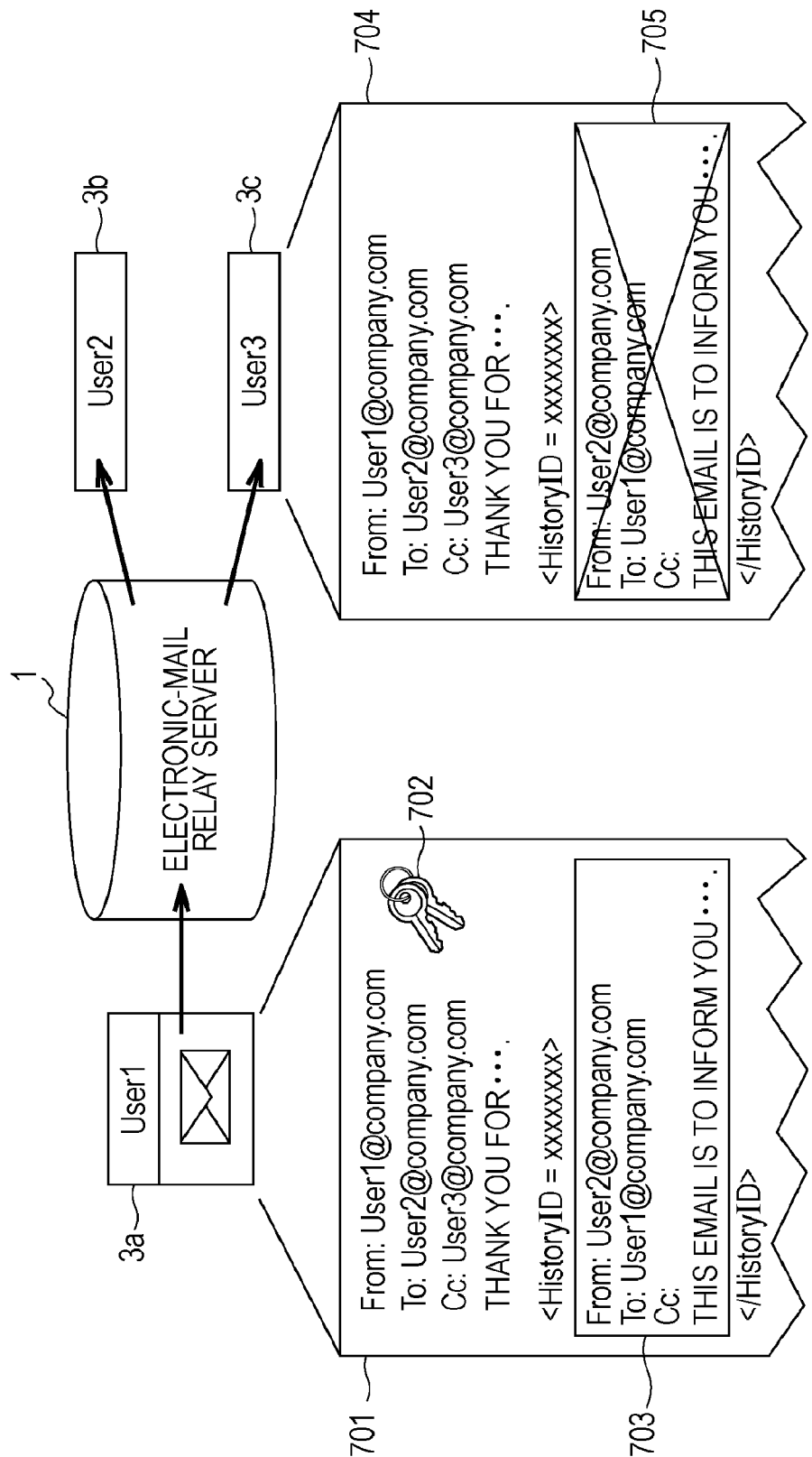
FIG. 7 is a schematic diagram showing the flow of an electronic-mail transmission process of an electronic mail system according to a second embodiment of the invention.

The operation of the electronic mail system using the electronic-mail relay server 1 according to the second embodiment of the invention will be described hereinbelow. FIG. 7 is a schematic diagram showing the flow of an electronic-mail transmission process of the electronic mail system according to the second embodiment of the invention. In FIG. 7, the mail sender User1 creates and transmits a new electronic mail with the client 3a used.

In the example of FIG. 7, the mail sender User 1 creates a new electronic mail 701 with quotation from an electronic mail 702 received from the mail recipient User2 in the past and transmits the electronic mail 701 to the mail recipient User2 and the mail recipient User3. The quoted electronic mail 702 quoted from the mail recipient User2 is stored in the mail-history-information storing section 131 and is assigned a history information ID (History ID) that identifies its history information.

At the point when the electronic mail 701 is newly created with quotation from the quoted electronic mail 703, encryption key information 702 for encrypting a newly created part of the electronic mail 701 is generated. Of course, also for the quoted electronic mail 703, encryption key information is generated at the point when the quoted electronic mail 703 is created. The encryption key information is stored in the edit-information storing section 132 in association with a history information ID that identifies the quoted electronic mail 703 at the point when the electronic-mail relay server 1 received the encryption key information.

The electronic mail 701 that is newly created with quotation from the quoted electronic mail 703 is transmitted to the electronic-mail relay server 1 together with the encryption key information 702 of the electronic mail 701 before being transmitted to the client 3b that the mail recipient User2 uses and the client 3c that the mail recipient User3 uses. The electronic-mail relay server 1 stores the received encryption key information 702 of the electronic mail 701 in the edit-information storing section 132 in association with a history information ID that identifies the electronic mail 701 and compares the destinations designated in the received electronic mail 701 with the originator and the destination set in the quoted electronic mail 703 to determine whether the destinations set in the electronic mail 701 includes a new destination not included in the quoted electronic mail 703.

In the example of FIG. 7, the mail recipient User2 is included in the originator set in the quoted electronic mail 703, but the mail recipient User3 is not included in the originator and the destination set in the quoted electronic mail 703. Accordingly, the electronic-mail relay server 1 determines that the mail recipient User3 is a new destination, who is a mail recipient to whom the quoted electronic mail 703 does not need to be disclosed, and encrypts the quoted electronic mail 703 included in the electronic mail 701 using the encryption key information stored in the edit-information storing section 132 so that the mail recipient User3 cannot read it.

Specifically, the electronic-mail relay server 1 transfers the electronic mail 701 as it is to the client 3b that the mail recipient User2 uses and transfers an electronic mail 704 including a quoted electronic mail 705 encrypted from the electronic mail 703 to the client 3c that the mail recipient User3 uses. The mail recipient User3 cannot read the quoted electronic mail 703 because the quoted electronic mail 703 is an encrypted quoted electronic mail 705 in the received electronic mail 704. Since only the history information ID is left, it can be determined that some information has been encrypted. The encryption key information used to encrypt the quoted electronic mail 703 is stored, as edit information, in the edit-information storing section 132 of the electronic-mail relay server 1 in association with a new history information ID that identifies the quoted electronic mail 703.

Figure 8:
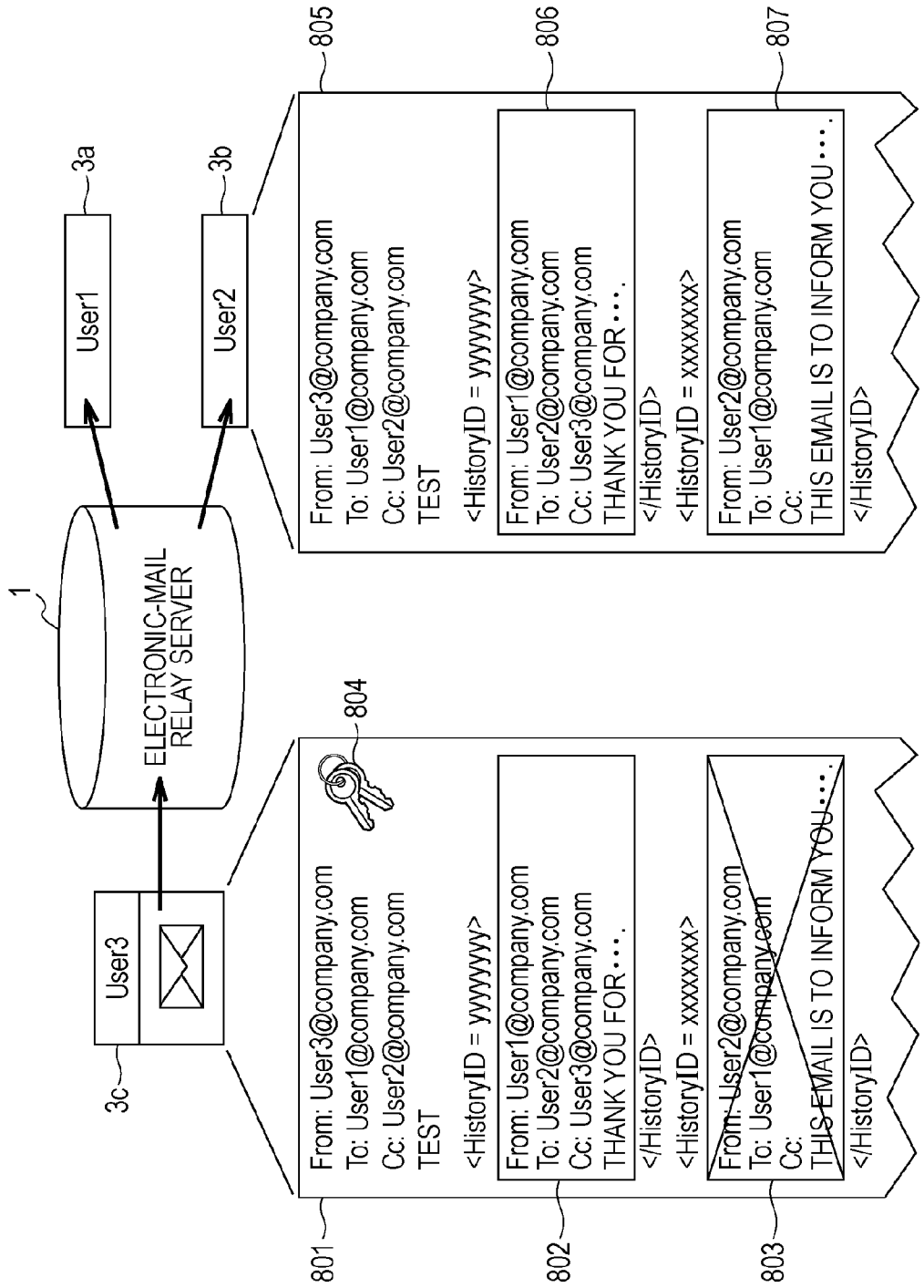
FIG. 8 is a schematic diagram showing the flow of an electronic-mail replying process of the electronic mail system according to the second embodiment of the invention.

FIG. 8 is a schematic diagram showing the flow of an electronic-mail replying process of the electronic mail system according to the second embodiment of the invention. In FIG. 8, the mail sender User3 creates and transmits a new electronic mail with the client 3c used.

In the example of FIG. 8, the mail sender User3 creates a new electronic mail 801 with quotation from an electronic mail 802 received from the mail recipient User1 and an electronic mail 803 received from the mail recipient User2 in the past and replies to the mail recipient User1 and the mail recipient User2. The quoted electronic mails 802 and 803 quoted from the mail recipient User1 and the mail recipient User2 are stored in the mail-history-information storing section 131 and assigned history information IDs (History IDs) that identify their history information.

At the point when the new electronic mail 801 was created with quotation from the quoted electronic mails 802 and 803, encryption key information 804 for encrypting a newly created part of the electronic mail 801 is generated. Of course, also for the quoted electronic mails 802 and 803, encryption key information is individually generated when the quoted electronic mails 802 and 803 are created and is stored in the edit-information storing section 132 in association with history information IDs that identify the quoted electronic mails 802 and 803 at the point when the electronic-mail relay server 1 received the encryption key information.

The electronic mail 801 that is newly created with quotation from the quoted electronic mails 802 and 803 is transmitted to the electronic-mail relay server 1 together with the encryption key information 804 of the electronic mail 801 before being transmitted to the client 3a that the mail recipient User1 uses and the client 3b that the mail recipient User2 uses. The electronic-mail relay server 1 stores the received encryption key information 804 of the electronic mail 801 in the edit-information storing section 132 in association with a history information ID that identifies the electronic mail 801 and decrypts the encrypted quoted electronic mail 803 using the stored encryption key information. That is, all of the quoted electronic mails 802 and 803 quoted in the electronic mail 801 can be read at this point of time.

The electronic-mail relay server 1 compares the destinations designated in the received electronic mail 801 and the originators and the destinations set in the quoted electronic mails 802 and 803 to determine whether the destinations designated in the electronic mail 801 include a new destination that is not included in the originators and the destinations set in the quoted electronic mails 802 and 803. In the example of FIG. 8, both of the mail recipient User1 and the mail recipient User2 are included in the originators and the destinations set in the quoted electronic mails 802 and 803. Therefore, unlike in FIG. 7, the electronic-mail relay server 1 determines that the mail recipient User 1 and the mail recipient User2 are mail recipients to whom the quoted electronic mails 802 and 803 may be disclosed and does not encrypt the quoted electronic mails 802 and 803.

Specifically, the electronic-mail relay server 1 transfers the electronic mail 801 in a state in which all the encrypted quoted electronic mails are decrypted to the client 3a that the mail recipient User1 uses and the client 3b that the mail recipient User2 uses. For example, the mail recipient User2 can also read the quoted electronic mail 807 in addition to the quoted electronic mail 806 in the received electronic mail 805.

Figure 9:
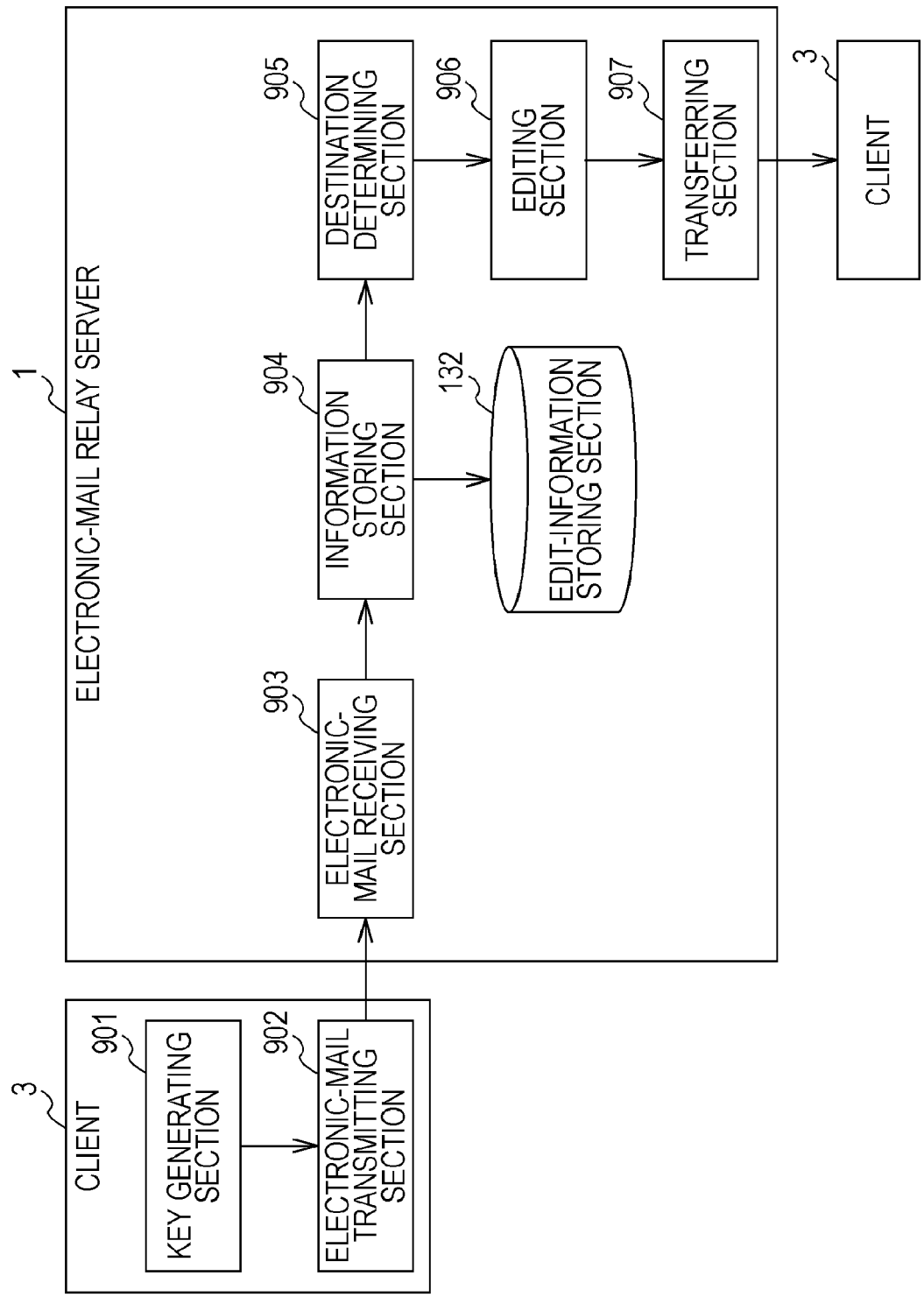
FIG. 9 is a functional block diagram of the electronic mail system according to the second embodiment of the invention.

FIG. 9 is a functional block diagram of the electronic mail system according to the second embodiment of the invention. In the client 3, a key generating section 901 generates encryption key information for encrypting/decrypting a newly created part at the point when a new electronic mail is created. An electronic-mail transmitting section 902 transmits the created encryption key information together with the newly created electronic mail to the electronic-mail relay server 1.

An electronic-mail receiving section 903 of the electronic-mail relay server 1 receives an electronic mail transmitted from one client 3 to one or a plurality of other clients 3. Assume that the received electronic mail is an electronic mail that is newly created with quotation from one or plurality of electronic mails.

An information storing section 904 stores encryption key information attached to the received electronic mail in the edit-information storing section 132 in association with a history information ID that identifies the received electronic mail. This allows the encryption key information for decrypting an encrypted quoted electronic mail included in an electronic mail to be easily acquired, thus allowing the quoted electronic mail to be decrypted depending on the condition.

A destination determining section 905 determines, for each of the quoted electronic mails quoted in the received electronic mail, whether originators and destinations set in the quoted electronic mails include a destination designated in the received electronic mail. If the destination designated in the received electronic mail is not included, it can be determined that the designated destination is a new destination. Disclosing the quoted electronic mails to the new destination can lead to a leak of secret information.

An editing section 906 encrypts each of quoted electronic mails that are determined by the destination determining section 905 not to include the destination designated in the received electronic mail. Specifically, the editing section 906 extracts encryption key information for encryption by inquiring of the edit-information storing section 132, with the history information ID that identifies the quoted electronic mail as key information, and encrypts the quoted electronic mails using the extracted encryption key information.

A transferring section 907 transfers the electronic mail including the quoted electronic mails encrypted by the editing section 906 to a designated destination. If there are a plurality of destinations, encrypted quoted electronic mails differ among the destinations. Accordingly, even if the same quoted electronic mail is quoted, one mail recipient can read it and another mail recipient cannot read it.

Figure 10:
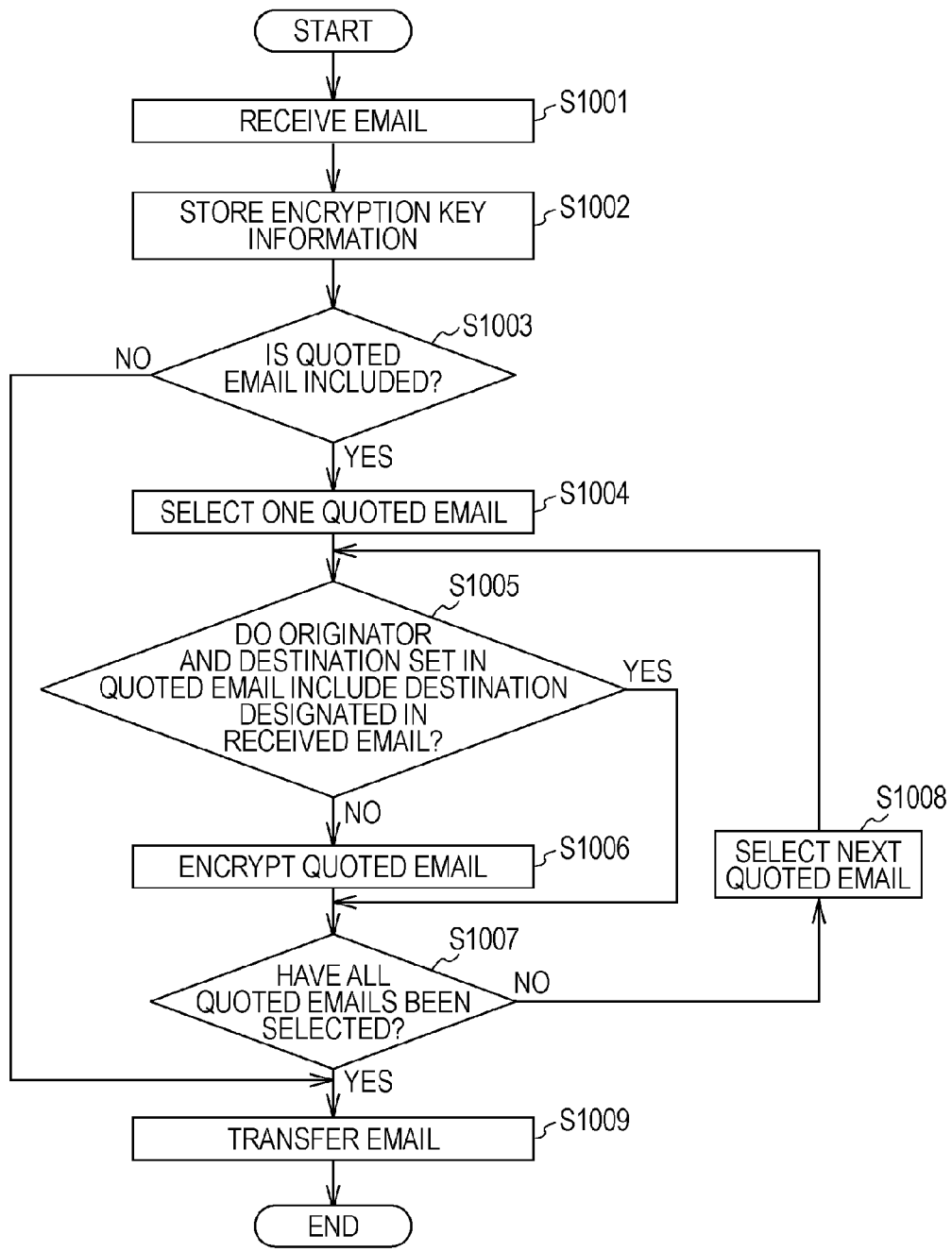
FIG. 10 is a flowchart showing the processing procedure of the CPU of the electronic-mail relay server according to the second embodiment of the invention.

FIG. 10 is a flowchart showing the processing procedure of the CPU 11 of the electronic-mail relay server 1 according to the second embodiment of the invention. The CPU 11 of the electronic-mail relay server 1 receives an electronic mail transmitted from one client 3 to one or a plurality of other clients 3 (step S1001). The CPU 11 stores encryption key information attached to the received electronic mail in the edit-information storing section 132 in association with a history information ID that identifies the received electronic mail (step S1002). Thus, even if the quoted electronic mail is encrypted, with the history information ID that identifies the quoted electronic mail as history information left, the quoted electronic mail can be decrypted depending on the condition because the encryption key information for decryption is stored in association with the history information ID.

The CPU 11 determines whether the received electronic mail is an electronic mail that is newly created with quotation from one or a plurality of electronic mails, that is, whether the received electronic mail includes a quoted electronic mail (step S1003).

If the CPU 11 determines that the received electronic mail includes quoted electronic mails (step S1003: YES), the CPU 11 selects one quoted electronic mail from the included quoted electronic mails (step S1004) and determines whether an originator and a destination set in the selected quoted electronic mail include a destination designated in the received electronic mail (step S1005).

If the CPU 11 determines that the originator and the destination set in the selected quoted electronic mail do not include the destination designated in the received electronic mail (step S1005: NO), the CPU 11 encrypts the quoted electronic mail using the encryption key information stored in the edit-information storing section 132 in association with the history information ID (step S1006).

If the CPU 11 determines that the originator and the destination set in the selected quoted electronic mail include the destination designated in the received electronic mail (step S1005: YES), the CPU 11 skips step S1006 and determines whether all the quoted electronic mails included in the received electronic mail have been selected (step S1007). If the CPU 11 determines that there is an unelected quoted electronic mail (step S1007: NO), the CPU 11 selects the next quoted electronic mail (step S1008), returns the process to step S1005, and repeats the process described above.

If the CPU 11 determines that the received electronic mail includes no quoted electronic mail (step S1003: NO), the CPU 11 skips step S1004 to step S1008. If the CPU 11 determines that all the quoted electronic mails included in the received electronic mail have been selected (step S1007: YES), the CPU 11 transfers the electronic mail including the quoted electronic mails to the designated destination (step S1009).

According to the second embodiment, as described above, even if a new electronic mail is created with quotation from an electronic mail transmitted and received in the past, secret information included in the quoted electronic mail can be disclosed only to a mail recipient to whom the quoted electronic mail needs to be disclosed by determining whether to encrypt the quoted electronic mail for each new destination.

Figure 11:
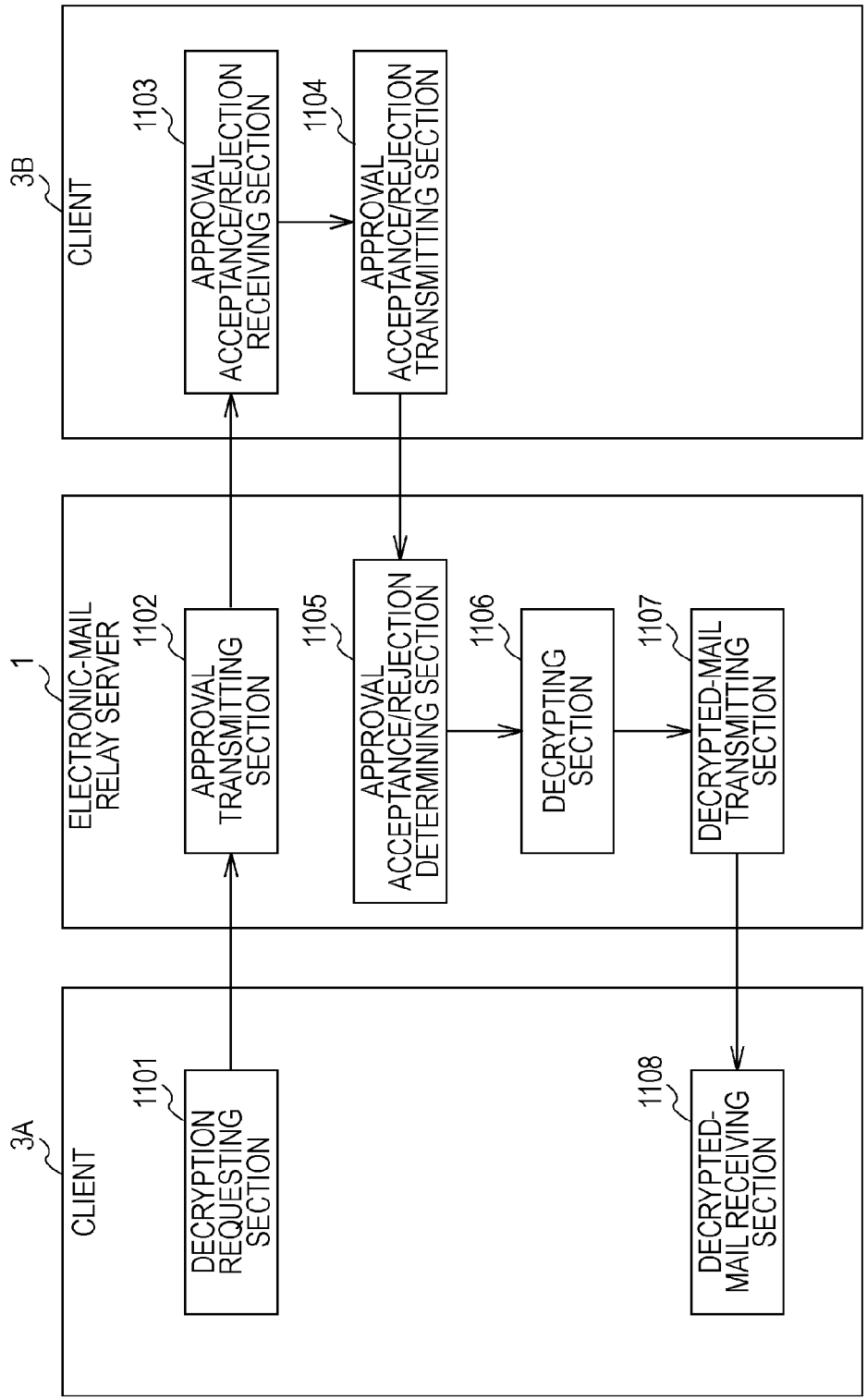
FIG. 11 is a functional block diagram showing the procedure of a quoted-electronic-mail decrypting process of the electronic mail system according to the second embodiment of the invention.

If an originator who created an electronic mail that quotes from an encrypted electronic mail immediately before approves that the mail recipient reads the encrypted quoted electronic mail, the quoted electronic mail can be decrypted and changed to a state in which it can be read by the mail recipient using the encryption key information stored in the edit-information storing section 132. FIG. 11 is a functional block diagram showing the procedure of a quoted-electronic-mail decrypting process of the electronic mail system according to the second embodiment of the invention. FIG. 11 illustrates a case in which a decryption request is transmitted from a client 3A that a mail recipient who has received an electronic mail including an encrypted quoted electronic mail uses.

In FIG. 11, a decryption requesting section 1101 of the client 3A transmits a request for decrypting an encrypted quoted electronic mail to the electronic-mail relay server 1. An approval transmitting section 1102 of the electronic-mail relay server 1 that has received the decryption request transmits approval confirmation information that inquires about whether to approve the decryption request to a client 3B that an originator set in the encrypted quoted electronic mail uses.

An approval acceptance/rejection accepting section 1103 of the client 3B that has received the approval confirmation information accepts the acceptance/rejection of approval of the decryption request. A method for accepting the acceptance/rejection of approval is not particularly limited; it may be accepted by operating a button displayed on the display 43 with the mouse 42, or alternatively, by directly typing on the keyboard 41.

An approval acceptance/rejection transmitting section 1104 transmits the received information on the acceptance/rejection of approval to the electronic-mail relay server 1. An approval acceptance/rejection determining section 1105 of the electronic-mail relay server 1 that has received the information on the acceptance/rejection of approval determines whether decryption by the client 3B has been approved, and if it is determined that the decryption has been approved, a decrypting section 1106 decrypts the encrypted quoted electronic mail using the encryption key information stored in the edit-information storing section 132.

A decrypted-mail transmitting section 1107 transmits the decrypted quoted electronic mail to the client 3A that has transmitted the decryption request. By receiving the decrypted quoted electronic mail with a decrypted-mail receiving section 1108 of the client 3A, the encrypted quoted electronic mail can be read.

The approval confirmation information may be transmitted not only to the client 3B that the originator set in the encrypted quoted electronic mail uses but also to a mail address that a user (supervisor or the like) having approval rights on whether to approve the decryption request. In this case, information on the acceptance/rejection of approval is transmitted from the user.

Figure 12:
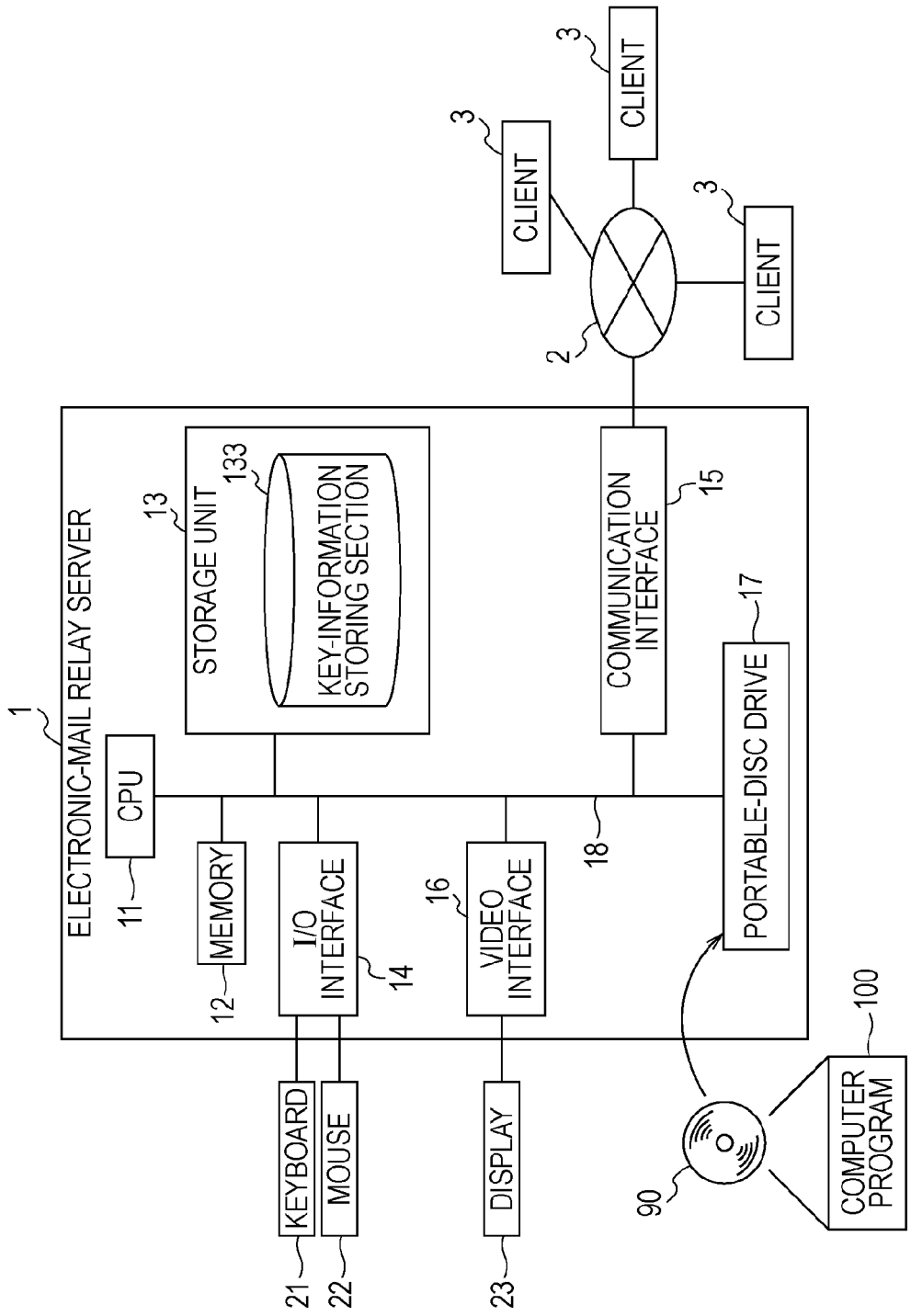
FIG. 12 is a block diagram showing a configuration example of an electronic mail system according to a third embodiment of the invention.

FIG. 12 is a block diagram showing a configuration example of an electronic mail system according to a third embodiment of the invention. The configuration of the electronic mail system according to the third embodiment of the invention is similar to those of the first and second embodiments. Therefore, its detailed description will be omitted by giving the same reference numerals. The third embodiment differs from the second embodiment in that quoted electronic mail is encrypted using encryption key information and that the encryption key information used in encryption is also encrypted using public-key information. That is, a pair of public-key information and secret-key information is stored in advance in the storage unit 13 of the electronic-mail relay server 1, and encryption key information of each history information ID attached to the electronic mail is encrypted and decrypted. This eliminates the need for storing electronic mail, encryption key information, etc. associated with history information IDs in the electronic-mail relay server 1.

In FIG. 12, the storage unit 13 includes a key-information storing section 133 that stores a pair of public-key information and secret-key information as edit information. The public-key information is used to encrypt encryption key information attached to an electronic mail or an quoted electronic mail, and the secret-key information is used to decrypt encryption key information attached to an electronic mail or a quoted electronic mail and encrypted using the public-key information. The public-key information is transmitted in advance to all the clients 3 that transmit and receive mails using the electronic-mail relay server 1 and is stored in the individual storage units 33 of the clients 3.

Figure 13:
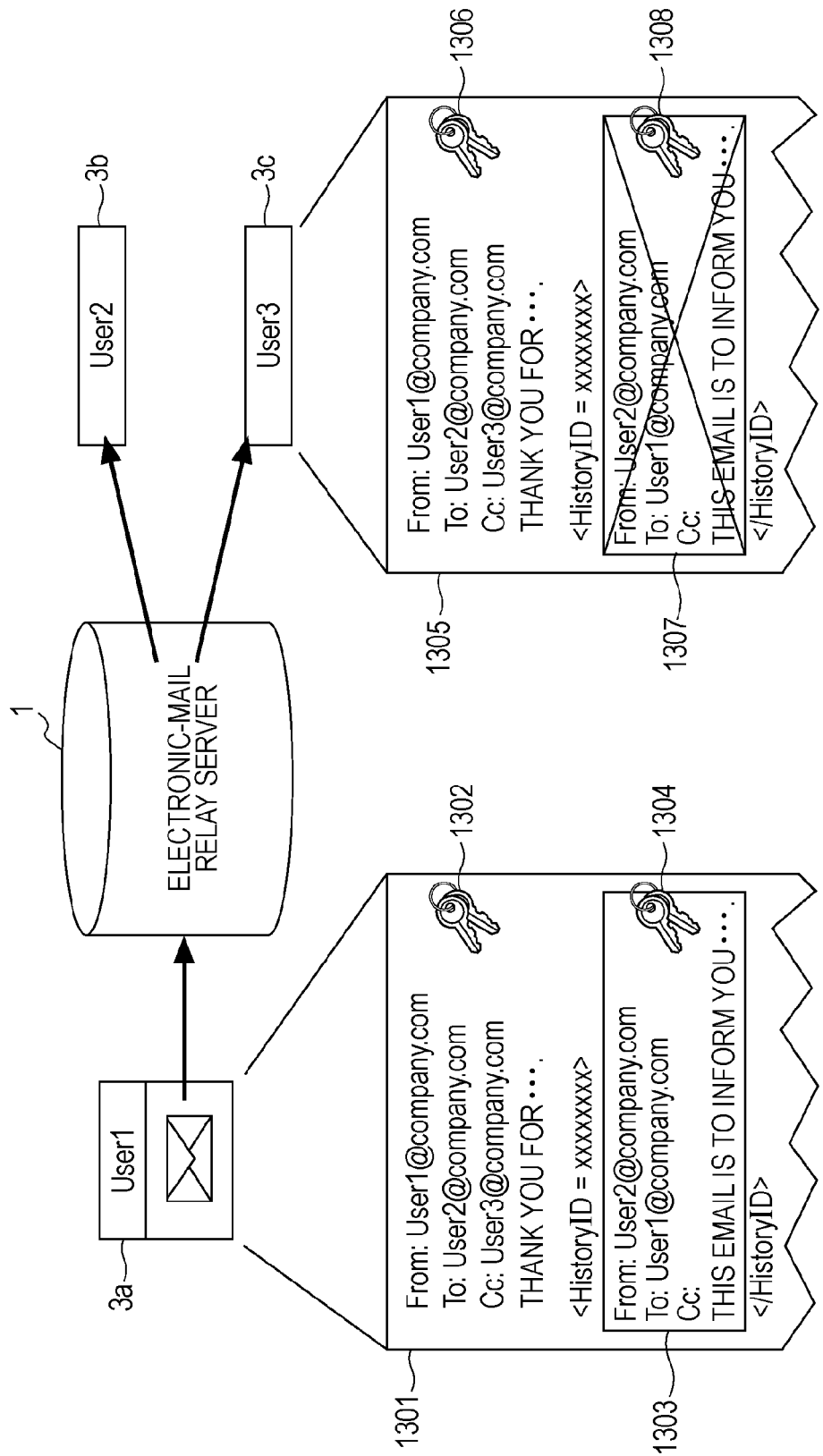
FIG. 13 is a schematic diagram showing the flow of an electronic-mail transmission process of the electronic mail system according to the third embodiment of the invention.

The operation of the electronic mail system using the electronic-mail relay server 1 according to the third embodiment of the invention will be described hereinbelow. FIG. 13 is a schematic diagram showing the flow of an electronic-mail transmission process of the electronic mail system according to the third embodiment of the invention. In FIG. 13, the mail sender User1 creates and transmits a new electronic mail with the client 3a used.

In the example of FIG. 13, the mail sender User 1 creates a new electronic mail 1301 with quotation from an electronic mail 1303 received from the mail recipient User2 in the past and transmits the electronic mail 1301 to the mail recipient User2 and the mail recipient User3.

At the point when the electronic mail 1301 is newly created with quotation from the quoted electronic mail 1303, encryption key information 1302 for encrypting a newly created part of the electronic mail 1301 is generated, and the generated encryption key information 1302 is encrypted using the public-key information stored in the storage unit 33 and is attached to the electronic mail 1301. Of course, also for the quoted electronic mail 1303, encryption key information 1304 is generated at the point when the quoted electronic mail 1303 is created and is attached to the quoted electronic mail 1303 in a state in which it is encrypted using the public-key information stored in the storage unit 33.

The electronic mail 1301 that is newly created with quotation from the quoted electronic mail 1303 is transmitted to the electronic-mail relay server 1 together with the encryption key information 1302 of the electronic mail 1301 and the encryption key information 1304 of the quoted electronic mail 1303 before being transmitted to the client 3b that the mail recipient User2 uses and the client 3c that the mail recipient User3 uses. The electronic-mail relay server 1 decrypts the encryption key information 1302 and 1304 attached to the received electronic mail 1301 and the quoted electronic mail 1303, respectively, with the secret-key information stored in the key-information storing section 133 and decrypts the encrypted quoted electronic mail 1303 with the decrypted encryption key information 1304. The electronic-mail relay server 1 compares the destinations designated in the received electronic mail 1301 with the originator and the destination set in the quoted electronic mail 1303 to determine whether the destinations designated in the electronic mail 1301 include a new destination that is not included in the quoted electronic mail 1303.

In the example of FIG. 13, the mail recipient User2 is included in the originator set in the quoted electronic mail 1303, but the mail recipient User3 is not included in the originator and the destination set in the quoted electronic mail 1303. Accordingly, the electronic-mail relay server 1 determines that the mail recipient User3 is a new destination, who is a mail recipient to whom the quoted electronic mail 1303 does not need to be disclosed, and encrypts the quoted electronic mail 1303 using the decrypted encryption key information 1304 so as not to be read by the mail recipient User3. The encryption key information 1304 is encrypted again using the public-key information stored in the key-information storing section 133 and is transmitted together with the encrypted quoted electronic mail 1303.

Specifically, the electronic-mail relay server 1 transfers the electronic mail 1301 accompanied by the encrypted encryption key information 1302 and 1304 as it is to the client 3b that the mail recipient User2 uses and transfers an electronic mail 1305 in which encrypted encryption key information 1308 is attached to a quoted electronic mail 1307 obtained by encrypting the quoted electronic mail 1303 with the encryption key information 1304 to the client 3c that the mail recipient User3 uses. The electronic mail 1305 received by the client 3c that the mail recipient User3 uses is accompanied by encryption key information 1306 that encrypts/decrypts the received electronic mail 1305 and the encryption key information 1308 that encrypts/decrypts the quoted electronic mail 1307. Because the electronic mail 1305 is not encrypted, the mail recipient User3 can read the content on the client 3c. On the other hand, since the quoted electronic mail 1307 is encrypted, and the encryption key information 1308 for decrypting it is also encrypted using the public-key information, the mail recipient User3 cannot read the content of the quoted electronic mail 1307.

Figure 14:
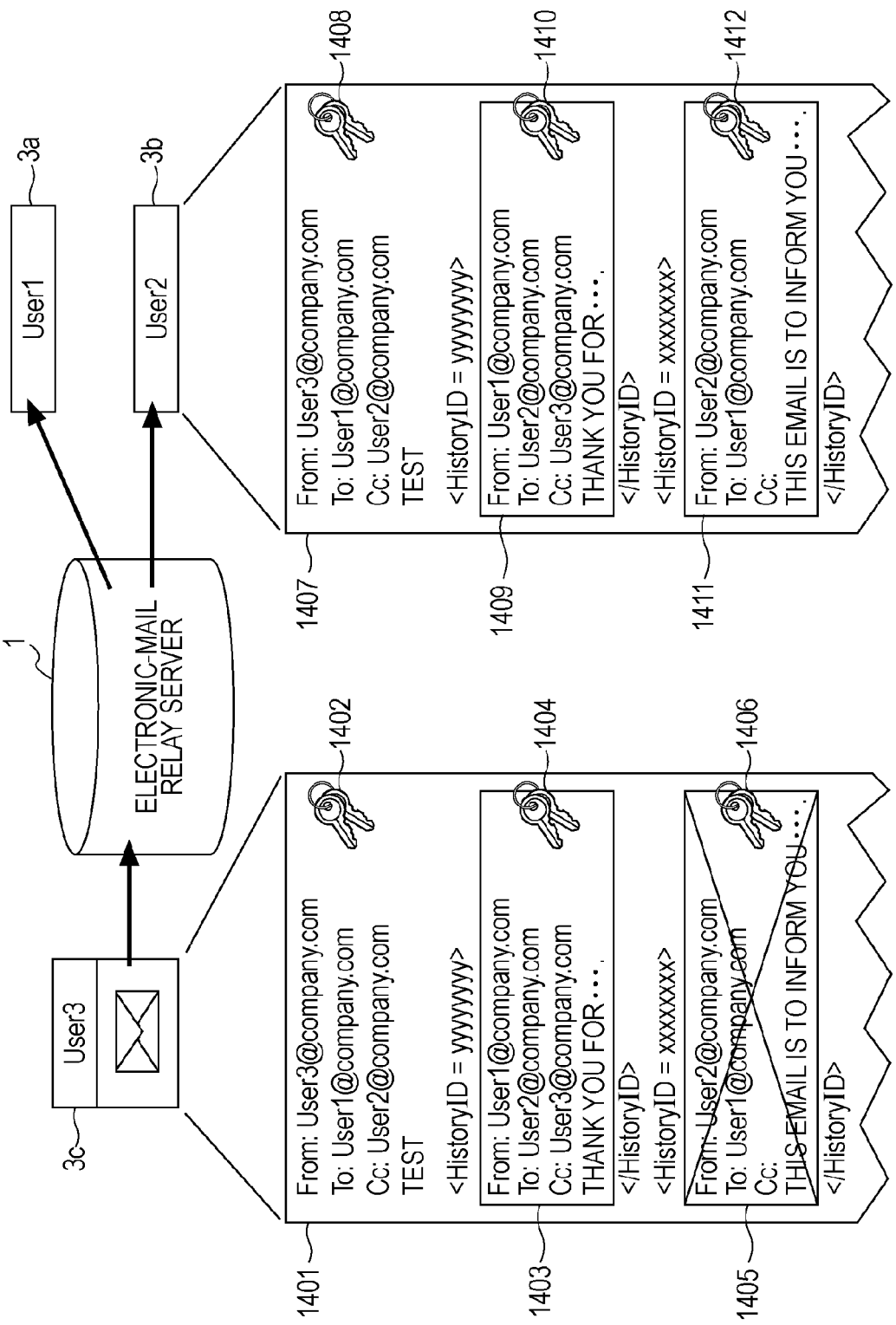
FIG. 14 is a schematic diagram showing the flow of an electronic-mail replying process of the electronic mail system according to the third embodiment of the invention.

FIG. 14 is a schematic diagram showing the flow of an electronic-mail replying process of the electronic mail system according to the third embodiment of the invention. In FIG. 14, the mail sender User3 creates and transmits a new electronic mail with the client 3c used.

In the example of FIG. 14, the mail sender User3 creates a new electronic mail 1401 with quotation from an electronic mail 1403 received from the mail recipient User1 and an electronic mail 1405 received from the mail recipient User2 in the past and replies to the mail recipient User1 and the mail recipient User2.

At the point when the electronic mail 1401 is newly created with quotation from the quoted electronic mails 1403 and 1405, encryption key information 1402 for encrypting a newly created part of the electronic mail 1401 is generated, and the generated encryption key information 1402 is encrypted using the public-key information stored in the storage unit 33 and is attached to the electronic mail 1401. Of course, also for the quoted electronic mails 1403 and 1405, encryption key information 1404 and 1406 are generated at the point when the quoted electronic mails 1403 and 1405 are created, respectively, and are attached to the quoted electronic mails 1403 and 1405, with the encryption key information 1404 and 1406 encrypted using the public-key information stored in the storage unit 33.

The electronic mail 1401 that is newly created with quotation from the quoted electronic mails 1403 and 1405 is transmitted to the electronic-mail relay server 1 together with the encryption key information 1402 of the electronic mail 1401 and the encryption key information 1404 and 1406 of the quoted electronic mails 1403 and 1405 before being transmitted to the client 3a that the mail recipient User1 uses and the client 3b that the mail recipient User2 uses.

The electronic-mail relay server 1 decrypts the encryption key information 1402, 1404, and 1406 attached to the received electronic mail 1401 and the quoted electronic mails 1403 and 1405, respectively, with secret-key information stored in the key-information storing section 133 and decrypts the encrypted quoted electronic mails 1403 and 1405 with the decrypted encryption key information 1404 and 1406, respectively. The electronic-mail relay server 1 compares the destinations designated in the received electronic mail 1401 with the originators and the destinations set in the quoted electronic mails 1403 and 1405 to determine whether the destinations designated in the electronic mail 1401 include a new destination not included in the quoted electronic mails 1403 and 1405.

In the example of FIG. 14, both of the mail recipient User1 and the mail recipient User2 are included in the originators and the destinations set in the quoted electronic mails 1403 and 1405. Therefore, unlike in FIG. 13, the electronic-mail relay server 1 determines that the mail recipient User1 and the mail recipient User2 are mail recipients to whom the quoted electronic mails 1403 and 1405 may be disclosed and does not encrypt the quoted electronic mails 1403 and 1405 included in the electronic mail 1401 using the attached encryption key information 1404 and 1406.

Specifically, the electronic-mail relay server 1 transfers the electronic mail 1401 in a state in which the encrypted encryption key information 1402, 1404, and 1406 is attached thereto to the client 3a that the mail recipient User1 uses and the client 3b that the mail recipient User2 uses. The electronic-mail relay server 1 transfers encryption key information 1408 for encrypting an electronic mail 1407, encryption key information 1410 for encrypting an quoted electronic mail 1409, and encryption key information 1412 for encrypting an quoted electronic mail 1411 together therewith in an encrypted state. This allows the mail recipient User2, for example, to read also the quoted electronic mail 1411, in addition to the quoted electronic mail 1409, in the received electronic mail 1407.

Figure 15:
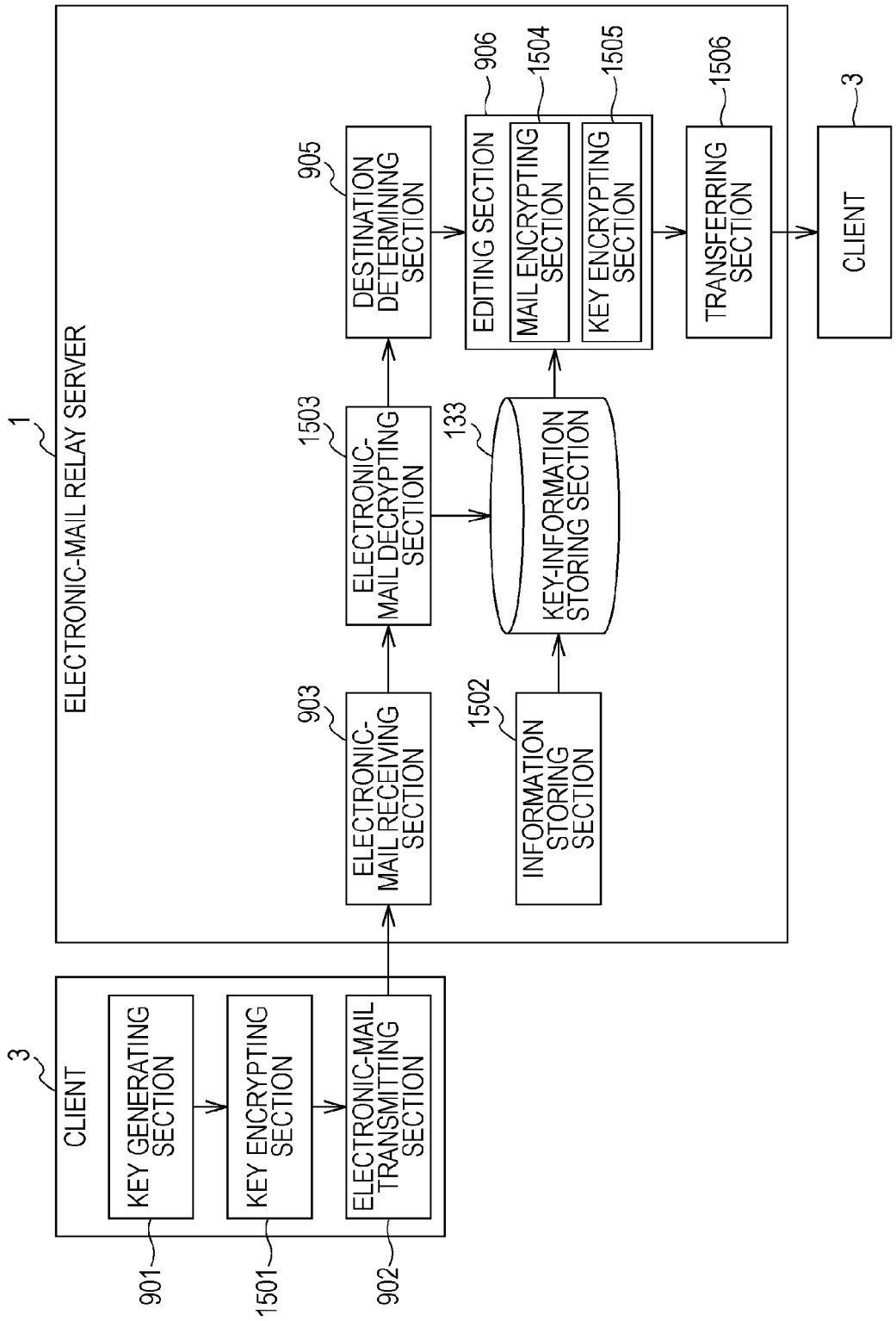
FIG. 15 is a functional block diagram of the electronic mail system according to the third embodiment of the invention.

FIG. 15 is a functional block diagram of the electronic mail system according to the third embodiment of the invention. In the client 3, the key generating section 901 generates encryption key information for encrypting/decrypting a newly created part at the point when a new electronic mail is created. A key encrypting section 1501 encrypts the generated encryption key information using the public-key information stored in the storage unit 33. The electronic-mail transmitting section 902 transmits the encrypted encryption key information to the electronic-mail relay server 1 together with the newly created electronic mail.

The electronic-mail receiving section 903 of the electronic-mail relay server 1 receives an electronic mail transmitted from one client 3 to one or a plurality of other clients 3. Assume that the received electronic mail is an electronic mail that is newly created with quotation from one or plurality of electronic mails.

An information storing section 1502 stores a pair of public-key information and secret-key information for encrypting/decrypting encryption key information attached to a received electronic mail in the key-information storing section 133. This allows the encryption key information itself for decrypting the encrypted quoted electronic mail to be encrypt/decrypted, thus allowing the acceptance/rejection of reading the content of the quoted electronic mail to be controlled according to the condition without storing the received electronic mail, the encryption key information, etc. in association with history information IDs.

A mail decrypting section 1503 decrypts encryption key information attached to the received electronic mail and the quoted electronic mails using the secret-key information stored in the key-information storing section 133 and decrypts the encrypted quoted electronic mails using the decrypted encryption key information. The destination determining section 905 determines, for each of the quoted electronic mails quoted in the received electronic mail, whether originators and destinations set in the quoted electronic mails include a destination designated in the received electronic mail. If the destination designated in the received electronic mail is not included, it can be determined that the designated destination is a new destination. Disclosing the quoted electronic mails to the new destination can lead to a leak of secret information.

The editing section 906 includes a mail encrypting section 1504 and a key encrypting section 1505. The mail encrypting section 1504 individually encrypts quoted electronic mails that are determined by the destination determining section 905 not to include the destination designated in the received electronic mail. Specifically, the editing section 906 encrypts the quoted electronic mails using encryption key information decrypted by the mail decrypting section 1503.

The key encrypting section 1505 encrypts the encryption key information attached to the quoted electronic mails using the public-key information stored in the key-information storing section 133. Thus, even if an electronic mail accompanied by encryption key information is transmitted, quoted electronic mails cannot be decrypted because the encryption key information is encrypted, so that, quoted electronic mails, if encrypted, cannot be read.

A transferring section 1506 transfers the electronic mail including the quoted electronic mails encrypted by the editing section 906 to a designated destination together with corresponding encrypted encryption key information.

Figure 16:
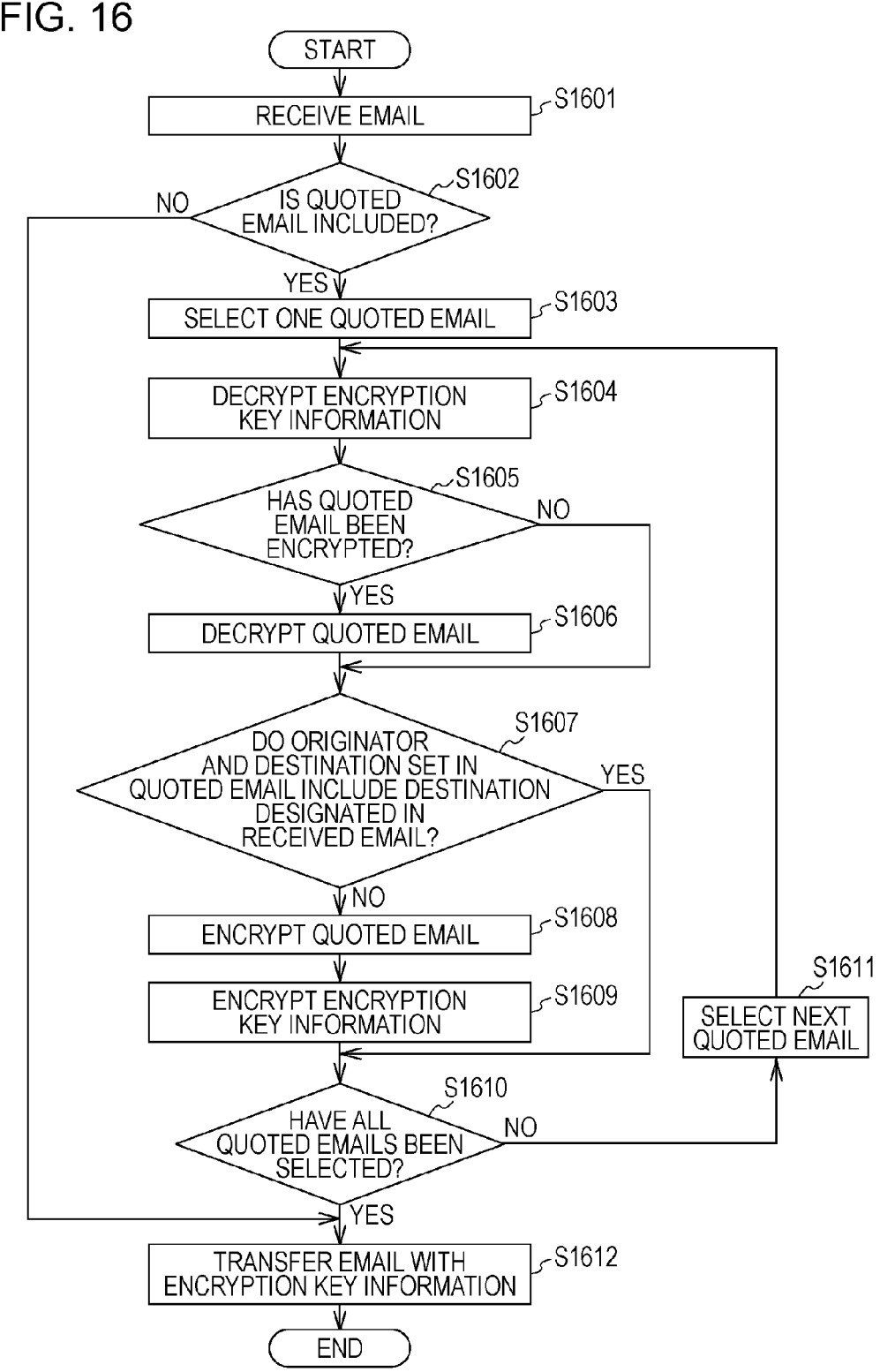
FIG. 16 is a flowchart showing the processing procedure of the CPU of the electronic-mail relay server according to the third embodiment of the invention.

FIG. 16 is a flowchart showing the processing procedure of the CPU 11 of the electronic-mail relay server 1 according to the third embodiment of the invention. The CPU 11 of the electronic-mail relay server 1 receives an electronic mail transmitted from one client 3 to one or a plurality of other clients 3 (step S1601).

The CPU 11 determines whether the received electronic mail is an electronic mail that is newly created with quotation from one or a plurality of electronic mails, that is, whether the received electronic mail includes a quoted electronic mail (step S1602).

If the CPU 11 determines that the received electronic mail includes quoted electronic mails (step S1602: YES), the CPU 11 selects one quoted electronic mail from the included quoted electronic mails (step S1603) and decrypts encryption key information attached to the quoted electronic mail using the secret-key information stored in the key-information storing section 133 (step S1604). The CPU 11 determines whether the selected quoted electronic mail has been encrypted (step S1605).

If the CPU 11 determines that the selected quoted electronic mail has been encrypted (step S1605: YES), the CPU 11 decrypts the quoted electronic mail using the decrypted encryption key information (step S1606). If the CPU 11 determines that the selected quoted electronic mail has not been encrypted (step S1605: NO), the CPU 11 skips step S1606 and determines whether an originator and a destination set in the selected quoted electronic mail include a destination designated in the received electronic mail (step S1607).

If the CPU 11 determines that the originator and the destination set in the selected quoted electronic mail do not include the destination designated in the received electronic mail (step S1607: NO), the CPU 11 encrypts the quoted electronic mail using the decrypted encryption key information (step S1608) and again encrypts the encryption key information used to encrypt the quoted electronic mail using the public-key information stored in the key-information storing section 133 (step S1609).

If the CPU 11 determines that the originator and the destination set in the selected quoted electronic mail include the destination designated in the received electronic mail (step S1607: YES), the CPU 11 skips step S1608 and step S1609 and determines whether all the quoted electronic mails included in the received electronic mail have been selected (step S1610). If the CPU 11 determines that there is an unselected quoted electronic mail (step S1610: NO), the CPU 11 selects the next quoted electronic mail (step S1611), returns the process to step S1604, and repeats the process described above.

If the CPU 11 determines that the received electronic mail includes no quoted electronic mail (step S1602: NO), the CPU 11 skips step S1603 to step S1611. If the CPU 11 determines that all the quoted electronic mails have been selected (step S1610: YES), the CPU 11 transfers the electronic mail including the quoted electronic mails together with encrypted encryption key information to the designated destination (step S1612).

According to the third embodiment, as described above, even if a new electronic mail is created with quotation from an electronic mail transmitted and received in the past, secret information included in the quoted electronic mail can be disclosed only to a mail recipient to whom the quoted electronic mail needs to be disclosed by determining whether to encrypt the quoted electronic mail for each new destination.

Figure 17:
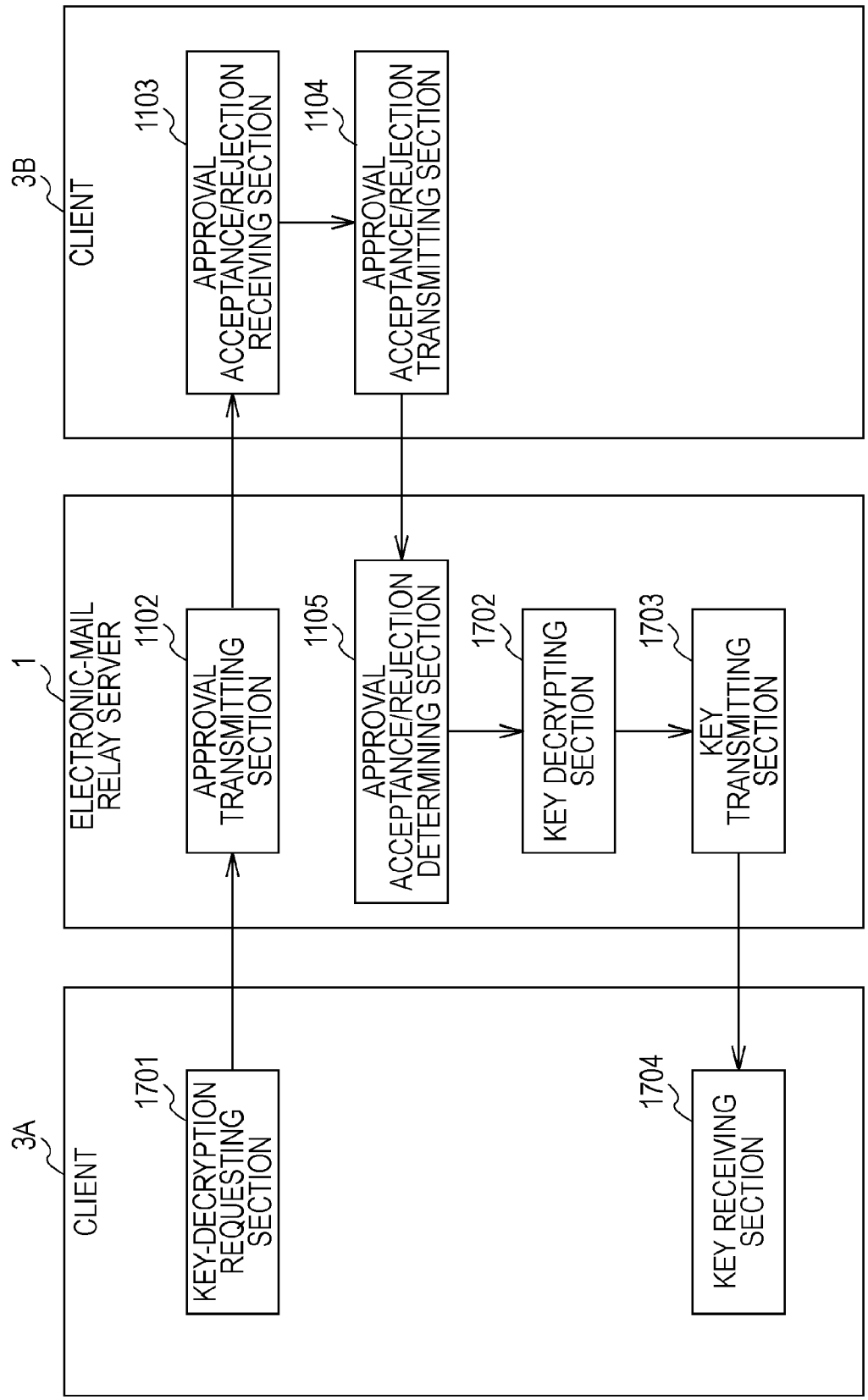
FIG. 17 is a functional block diagram showing the procedure of an encryption-key-information decrypting process of the electronic mail system according to the third embodiment of the invention.

If an originator who created an electronic mail that quotes from a quoted electronic mail immediately before approves that the mail recipient reads the encrypted quoted electronic mail, the encrypted quoted electronic mail can be brought to a state in which it can be read by the mail recipient by decrypting the encryption key information that encrypts the quoted electronic mail using secret-key information corresponding to the public-key information stored in the key-information storing section 133 and transmitting the quoted electronic mail together with the decrypted encryption key information. FIG. 17 is a functional block diagram showing the procedure of an encryption-key-information decrypting process of the electronic mail system according to the third embodiment of the invention. FIG. 17 illustrates a case in which a decryption request is transmitted from the client 3A that a mail recipient who has received an electronic mail including encrypted encryption key information uses.

In FIG. 17, a key-decryption requesting section 1701 of the client 3A transmits a request for decrypting encrypted encryption key information to the electronic-mail relay server 1. The approval transmitting section 1102 of the electronic-mail relay server 1 that has received the key-decryption request transmits approval confirmation information for inquiring whether to approve the key-decryption request to the client 3B that an originator set in the encrypted quoted electronic mail uses.

The approval acceptance/rejection accepting section 1103 of the client 3B that has received the approval confirmation information accepts the acceptance/rejection of approval of the key decryption request. A method for accepting the acceptance/rejection of approval is not particularly limited; it may be accepted by operating a button displayed on the display 43 with the mouse 42, or alternatively, by directly typing on the keyboard 41.

The approval confirmation information may be transmitted not only to the client 3B that the originator set in the encrypted quoted electronic mail but also to a mail address that a user (supervisor or the like) having approval rights on whether to approve the decryption request. In this case, information on the acceptance/rejection of approval is transmitted from the user.

The approval acceptance/rejection transmitting section 1104 transmits the received information on the acceptance/rejection of approval to the electronic-mail relay server 1. The approval acceptance/rejection determining section 1105 of the electronic-mail relay server 1 that has received the information on the acceptance/rejection of approval determines whether decryption by the client 3B has been approved, and if it is determined that the decryption has been approved, a key decrypting section 1702 decrypts the encrypted encryption key information using the secret-key information stored in the key-information storing section 133.

A key transmitting section 1703 transmits the decrypted encryption key information to the client 3A that has transmitted the request for decrypting the decryption key information. By receiving the decrypted decryption key information with a key receiving section 1704 of the client 3A, the encrypted quoted electronic mail can be decrypted and read.

Figure 18:
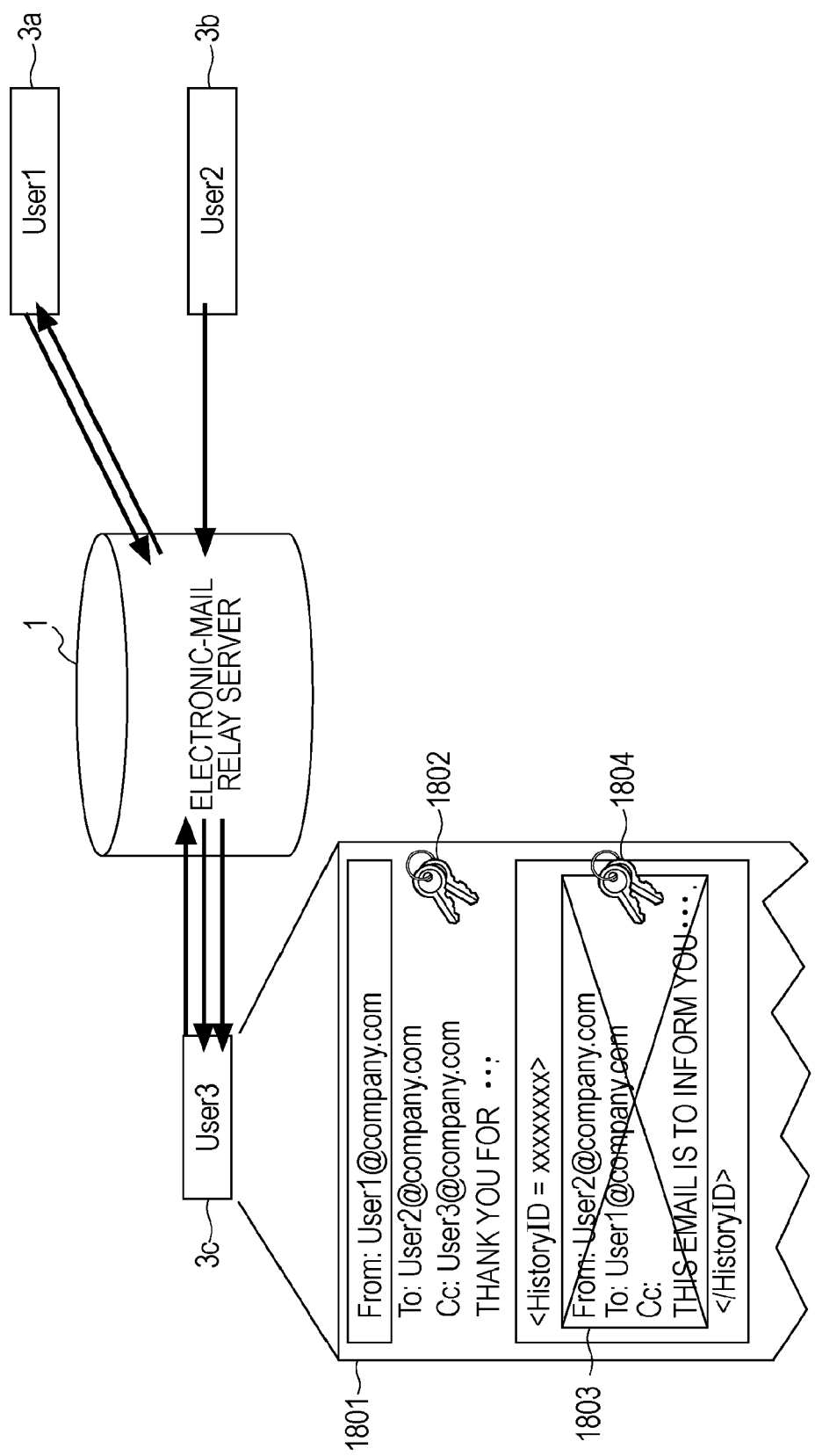
FIG. 18 is a schematic diagram showing the flow of an electronic-mail transmission process of the electronic mail system according to the third embodiment of the invention.

FIG. 18 is a schematic diagram showing the flow of an electronic-mail transmission process of the electronic mail system according to the third embodiment of the invention. In FIG. 18, since a quoted electronic mail 1803 in a received electronic mail 1801 is encrypted, and attached encryption key information 1804 is encrypted using public-key information, the mail recipient User3 cannot decrypt the quoted electronic mail 1803 and so cannot read the content of the quoted electronic mail 1803.

Thus, the mail recipient User3 transmits a key-decryption request for decrypting the encryption key information 1804 of the encrypted quoted electronic mail 1803 to the electronic-mail relay server 1. The key-decryption request includes a history information ID that identifies the encrypted quoted electronic mail 1803, the history information ID of the electronic mail 1801 that quotes from the quoted electronic mail 1803, and encryption key information 1802 and 1804 that encrypt the electronic mail 1801 and the quoted electronic mail 1803.

The electronic-mail relay server 1 that has received the key-decryption request transmits approval confirmation information for inquiring whether to approve the key-decryption request to the mail sender User1 who is the originator of the electronic mail 1801 that quotes the quoted electronic mail 1803.

The mail sender User 1 who has received the approval confirmation information determines whether the mail recipient User3 is a mail recipient who has no problem in disclosing the quoted electronic mail 1803, and if it is determined that the mail recipient User3 is a mail recipient who has no problem, the mail sender User 1 returns approval information indicating it to the electronic-mail relay server 1. The electronic-mail relay server 1 that has received the approval information decrypts the encryption key information 1804 that encrypts the quoted electronic mail 1803 using the secret-key information stored in the key-information storing section 133 and transmits the decrypted encryption key information 1804 to the mail recipient User3. If receiving no approval information or if receiving no-approval information indicating rejection, the electronic-mail relay server 1 transmits the encrypted encryption key information 1804 to the mail recipient User3.

The client 3c that the mail recipient User3 uses receives the encryption key information 1804 that encrypts the quoted electronic mail 1803. Thus, if the encryption key information 1804 that has encrypted the quoted electronic mail 1803 has been decrypted, the quoted electronic mail 1803 can be decrypted using the decrypted encryption key information 1804, which allows the mail recipient User3 to read the content of the quoted electronic mail 1803.

Of course, during the transmission of an electronic mail, the originator may individually designate mail recipients to whom quoted electronic mails may be disclosed. FIG. 19 is a schematic diagram showing the flow of an electronic-mail transmission process of the electronic mail system according to the third embodiment of the invention in the case of designating mail recipients to whom quoted electronic mails may be disclosed.

In FIG. 19, the mail sender User1 creates a new electronic mail 1901 with quotation from an electronic mail 1903 received from the mail recipient User2 in the past and transmits the new electronic mail 1901 to the mail recipient User2 and the mail recipient User3.

At the point when the electronic mail 1901 is newly created with quotation from the quoted electronic mail 1903, encryption key information 1902 for encrypting a newly created part of the electronic mail 1901 is generated, and the generated encryption key information 1902 is encrypted using the public-key information stored in the storage unit 33 and is attached to the electronic mail 1901. Of course, also for the quoted electronic mail 1903, encryption key information 1904 is generated at the point when the quoted electronic mail 1903 is created and is attached to the quoted electronic mail 1903 in a state in which the encryption key information 1904 is encrypted using the public-key information stored in the storage unit 33.

The quoted electronic mail 1903 is assigned a parameter "X-Protect" that designates the mail address of a mail recipient for whom it is not necessary to encrypt the quoted electronic mail 1903. For an electronic mail to be transmitted to the mail address designated by the parameter "X-Protect", the included quoted electronic mail 1903 is not encrypted. The example of FIG. 19 shows that the quoted electronic mail 1903 included in the electronic mail 1901 to be transmitted to the mail recipient User3 is not encrypted.

The electronic mail 1901 that is newly created with quotation from the quoted electronic mail 1903 is transmitted to the electronic-mail relay server 1 together with the encryption key information 1902 of the electronic mail 1901 and the encryption key information 1904 of the quoted electronic mail 1903 before being transmitted to the client 3b that the mail recipient User2 uses and the client 3c that the mail recipient User3 uses. The electronic-mail relay server 1 decrypts the encryption key information 1902 and 1904 attached to the received electronic mail 1901 and the quoted electronic mail 1903, respectively, using secret-key information stored in the key-information storing section 133 and decrypts the encrypted quoted electronic mail 1903 using the decrypted encryption key information 1904. The electronic-mail relay server 1 compares the destinations set in the received electronic mail 1901 with the originator and the destination set in the quoted electronic mail 1903 to determine whether the destinations designated in the electronic mail 1901 include a new destination not included in the quoted electronic mail 1903.

In the example of FIG. 19, the mail recipient User2 is included in the originator set in the quoted electronic mail 1903, but the mail recipient User3 is not included in the originator and the destination set in the quoted electronic mail 1903. Accordingly, the electronic-mail relay server 1 determines that the mail recipient User3 is a new destination, who is a mail recipient to whom the quoted electronic mail 1903 does not need to be disclosed. However, since the mail address of the mail recipient User3 is designated by the parameter "X-Protect" of the quoted electronic mail 1903, the quoted electronic mail 1903 included in the electronic mail 1901 is not encrypted using the attached encryption key information 1904.

Accordingly, the electronic mail 1901 is transferred as it is to the client 3b that the mail recipient User2 uses and the client 3c that the mail recipient User3 uses, so that the mail recipient User3 can read the content of the quoted electronic mail 1903 because the quoted electronic mail 1903 is not encrypted.

The present invention is not limited to the embodiments described above, and various changes and modifications may be made without departing from the spirit of the invention. For example, while the first to third embodiments described above disclose methods for editing quoted electronic mails so as not to be read, it is to be understood that the invention is not limited to the methods disclosed in the first to third embodiments. The method for encrypting/decrypting the encryption key information is also not particularly limited.

REFERENCE NUMERALS

1: electronic-mail relay server
2: network
3, 3a, 3b, 3c, 3A, 3B: client
11, 31: CPU
12, 32: memory
13, 33: storage unit
14, 34: I/O interface
15, 35: communication interface
16, 36: video interface
17, 37: portable-disc drive
18, 38: internal bus
23, 43: display
90, 91: portable recording medium
100, 101: computer program
131: mail-history-information storing section
132: edit-information storing section

What is claimed is:

1. A computer program product executable by a server connected to a plurality of clients so as to be able to transmit and receive electronic mails thereto and therefrom to thereby relay the electronic mails, the computer program product comprising:
a computer readable memory to store instructions, wherein execution of the instructions causes the server to implement:
an electronic-mail receiving section to receive an electronic mail that is newly created by one of the clients with quotation from one or a plurality of electronic mails received in the past;
a destination determining section to determine, for each quoted electronic mail quoted in the received electronic mail, whether a destination designated in the received electronic mail is included in an originator and a destination set in each quoted electronic mail;
an editing section to edit the content of each quoted electronic mail that is determined by the destination determining section not to include the destination designated in the received electronic mail, wherein editing the content comprises any of the following:
editing the quoted electronic mail into an unreadable state;
deleting the quoted electronic mail; or
encrypting the quoted electronic mail;
a transferring section to transfer the electronic mail including the quoted electronic mail edited by the editing section to the designated destination; and
an information storing section to store edition information for returning the quoted electronic mail edited by the editing section to a state before the editing in association with information that identifies the received electronic mail.

2. The computer program product according to claim 1, wherein
the information storing section is further configured to store key information from the client to decrypt the quoted electronic mail encrypted by the editing section in association with information that identifies the quoted electronic mail;
the editing section is further configured to encrypt the quoted electronic mail that is determined by the destination determining section not to include the destination designated in the received electronic mail using the key information stored in association therewith; and
the transferring section is further configured to transfer the electronic mail including the quoted electronic mail encrypted by the editing section to the designated destination.

3. The computer program product according to claim 2, further comprising an approval transmitting section that, in response to receiving a decryption request from the client for decrypting the encrypted quoted electronic mail, is further configured to transmit approval confirmation information to inquire whether to approve the decryption request to the client that created the electronic mail that quotes the quoted electronic mail or to a predetermined mail address.

4. The computer program product according to claim 1, wherein
the information storing section is further configured to store another key information to encrypt and/or decrypt key information to decrypt the quoted electronic mail encrypted by the editing section;
the editing section comprises:
a mail encrypting section to encrypt the quoted electronic mail that is determined by the destination determining section not to include the destination designated in the received electronic mail using attached key information; and
a key encrypting section to encrypt the key information that decrypts the quoted electronic mail using the other key information; and
the transferring section is further configured to transfer the electronic mail to the designated destination, the electronic mail comprising the quoted electronic mail that is determined by the destination determining section not to include the destination designated in the received electronic mail and that is accompanied by the encrypted key information.

5. The computer program product according to claim 4, further comprising an approval transmitting section that, in response to receiving a key-decryption request for decrypting the encrypted key information, is configured to transmit approval confirmation information to inquire whether to approve the key decryption request to the client that created the electronic mail that quotes the quoted electronic mail or to a predetermined mail address.

6. A server connected to a plurality of clients so as to be able to transmit and receive electronic mails thereto and therefrom to thereby relay the electronic mails, the server comprising:
 a processor;
 an electronic-mail receiving section to receive an electronic mail that is newly created by one of the clients with quotation from one or a plurality of electronic mails received in the past;
 a destination determining section to determine, for each quoted electronic mail quoted in the received electronic mail, whether a destination designated in the received electronic mail is included in an originator and a destination set in each quoted electronic mail;
 an editing section to edit the content of each quoted electronic mail that is determined by the destination determining section not to include the destination designated in the received electronic mail;
 a transferring section to transfer the electronic mail including the quoted electronic mail edited by the editing section to the designated destination, wherein editing the content comprises any of the following:
  editing the quoted electronic mail into an unreadable state;
  deleting the quoted electronic mail; or
  encrypting the quoted electronic mail; and
 an information storing section to store edition information for returning the quoted electronic mail edited by the editing section to a state before the editing in association with information that identifies the received electronic mail.

7. The server according to claim 6, wherein the information storing section is further configured to store key information from the client to decrypt the quoted electronic mail encrypted by the editing section in association with information that identifies the quoted electronic mail;
 the editing section is further configured to encrypt the quoted electronic mail that is determined by the destination determining section not to include the destination designated in the received electronic mail using the key information stored in association therewith; and
 the transferring section is further configured to transfer the electronic mail including the quoted electronic mail encrypted by the editing section to the designated destination.

8. The server according to claim 7, further comprising an approval transmitting section that, in response to receiving a decryption request from the client for decrypting the encrypted quoted electronic mail, is configured to transmit approval confirmation information to inquire whether to approve the decryption request to the client that created the electronic mail that quotes the quoted electronic mail or to a predetermined mail address.

9. The server according to claim 6, wherein the information storing section is further configured to store another key information to encrypt and/or decrypt key information to decrypt the quoted electronic mail encrypted by the editing section;
 the editing section comprises:
  a mail encrypting section to encrypt the quoted electronic mail that is determined by the destination determining section not to include the destination designated in the received electronic mail using attached key information; and
  a key encrypting section to encrypt the key information that decrypts the quoted electronic mail using the other key information; and
 the transferring section is further configured to transfer the electronic mail to the designated destination, the electronic mail comprising the quoted electronic mail that is determined by the destination determining section not to include the destination designated in the received electronic mail and that is accompanied by the encrypted key information.

10. The server according to claim 9, further comprising an approval transmitting section that, in response to receiving a key-decryption request for decrypting the encrypted key information, is configured to transmit approval confirmation information to inquire whether to approve the key decryption request to the client that created the electronic mail that quotes the quoted electronic mail or to a predetermined mail address.

11. A method executable by a system including a server connected to a plurality of clients so as to be able to transmit and receive electronic mails thereto and therefrom to thereby relay the electronic mails, the method comprising:
 receiving an electronic mail that is newly created by one of the clients with quotation from one or a plurality of electronic mails received in the past;
 determining, for each quoted electronic mail quoted in the received electronic mail, whether a destination designated in the received electronic mail is included in an originator and a destination set in each quoted electronic mail;
 editing the content of each quoted electronic mail that is determined not to include the destination designated in the received electronic mail, wherein editing the content comprises any of the following:
  editing the quoted electronic mail into an unreadable state;
  deleting the quoted electronic mail; or
  encrypting the quoted electronic mail;
 transferring the electronic mail including the edited quoted electronic mail to the designated destination; and
 storing edition information for returning the edited quoted electronic mail to a state before the editing in association with information that identifies the received electronic mail.

12. The method according to claim 11, further comprising:
 storing key information from a client to decrypt the quoted electronic mail encrypted by the editing section in association with information that identifies the quoted electronic mail;
 encrypting the quoted electronic mail that is determined by the destination determining section not to include the destination designated in the received electronic mail using the key information stored in association therewith; and
 transferring the electronic mail including the encrypted quoted electronic mail to the designated destination.

13. The method according to claim 12, further comprising, in response to receiving a decryption request from the client for decrypting the encrypted quoted electronic mail, transmitting approval confirmation information to inquire whether to approve the decryption request to the client that created the electronic mail that quotes the quoted electronic mail or to a predetermined mail address.

14. The method according to claim 11, further comprising:
 storing another key information to encrypt and/or decrypt key information to decrypt the quoted encrypted electronic mail;

encrypting the quoted electronic mail that is determined by the destination determining section not to include the destination designated in the received electronic mail using attached key information;

encrypting the key information that decrypts the quoted electronic mail using the other key information;

transferring the electronic mail to the designated destination, the electronic mail comprising the quoted electronic mail that is determined by the destination determining section not to include the destination designated in the received electronic mail and that is accompanied by the encrypted key information; and in response to receiving a key-decryption request for decrypting the encrypted key information, transmitting approval confirmation information to inquire whether to approve the key decryption request to the client that created the electronic mail that quotes the quoted electronic mail or to a predetermined mail address.

* * * * *